(12) United States Patent
Chen et al.

(10) Patent No.: US 11,743,785 B2
(45) Date of Patent: *Aug. 29, 2023

(54) METHOD AND APPARATUS FOR CONDITIONAL PSCELL CHANGE

(71) Applicant: FG Innovation Company Limited, Tuen Mun (HK)

(72) Inventors: Hung-Chen Chen, Taipei (TW); Mei-Ju Shih, Taipei (TW); Chie-Ming Chou, Taipei (TW)

(73) Assignee: FG Innovation Company Limited, Tuen Mun (HK)

( * ) Notice: Subject to any disclaimer, the term of this patent is extended or adjusted under 35 U.S.C. 154(b) by 0 days.

This patent is subject to a terminal disclaimer.

(21) Appl. No.: 17/990,411

(22) Filed: Nov. 18, 2022

(65) Prior Publication Data
US 2023/0079794 A1    Mar. 16, 2023

Related U.S. Application Data

(63) Continuation of application No. 17/033,086, filed on Sep. 25, 2020, now Pat. No. 11,582,651.
(Continued)

(51) Int. Cl.
*H04W 36/00* (2009.01)
*H04W 36/08* (2009.01)

(52) U.S. Cl.
CPC ....... *H04W 36/0072* (2013.01); *H04W 36/08* (2013.01)

(58) Field of Classification Search
CPC . H04W 36/0072; H04W 36/08; H04W 36/36; H04W 36/0069
See application file for complete search history.

(56) References Cited

U.S. PATENT DOCUMENTS

| 2017/0019945 A1* | 1/2017 | Chiba | H04W 76/19 |
| 2020/0396661 A1* | 12/2020 | Wu | H04W 36/00 |
| 2021/0400760 A1* | 12/2021 | Yang | H04W 76/19 |

FOREIGN PATENT DOCUMENTS

| CN | 107690163 A | 2/2018 |
| CN | 110022224 A | 7/2019 |

(Continued)

OTHER PUBLICATIONS

Ericsson ("Handling of a HO command while UE is monitoring CHO", 3GPP TSG RAN WG2 #107, R2-1909333, Aug. 26-30, 2019) (Year: 2019).*
(Continued)

*Primary Examiner* — Chi H Pham
*Assistant Examiner* — Ji-Hae Yea
(74) *Attorney, Agent, or Firm* — ScienBiziP, P.C.

(57) ABSTRACT

A method for a Conditional Primary Secondary Cell Group (SCG) Cell (PSCell) Change (CPC) procedure performed by a master node is provided. The method includes receiving, from a user equipment (UE), a UE capability report indicating that the UE supports conditional reconfiguration for a PSCell change; transmitting, to the UE, a first conditional reconfiguration for changing from a source PSCell to a target PSCell in an SCG portion of a radio resource control (RRC) reconfiguration message, the first conditional reconfiguration including a configuration of the target PSCell and an execution condition; and receiving, from the UE, a response message after the first conditional reconfiguration is applied by the UE. The first conditional reconfiguration enables the UE to evaluate the execution condition, and apply the configuration of the target PSCell and synchronize to the target PSCell after the execution condition is evaluated as satisfied.

18 Claims, 9 Drawing Sheets

Related U.S. Application Data

(60) Provisional application No. 62/906,273, filed on Sep. 26, 2019.

(56) References Cited

FOREIGN PATENT DOCUMENTS

| | | |
|---|---|---|
| CN | 110198550 A | 9/2019 |
| WO | 2019161742 A1 | 8/2019 |

OTHER PUBLICATIONS

CATT ("Consideration on the UE capability of supporting CHO", 3GPP TSG RAN WG2 Meeting #107, R2-1908928, Aug. 26-30, 2019) (Year: 2019).*

Ericsson ("Signalling aspects of SCG change with minimal interruption", 3GPP TSG-RAN WG2 #107, R2-1908965, Aug. 26-30, 2019) (Year: 2019).*

Ericsson, "Handling of a HO command while UE is monitoring CHO", R2-1909333, 3GPP TSG RAN WG2 #107, Prague, Czech Republic, Aug. 26-30, 2019.

CATT, Consideration on the UE capability of supporting CHO, R2-1908928, Resubmission of R2-1906646, 3GPP TSG RAN WG2 Meeting #107, Prague, Czech, Aug. 26-30, 2019.

Ericsson, "Signalling aspects of SCG change with minimal interruption", R2-1908965, 3GPP TSG-RAN WG2 #107, Prague, Czech Republic, Aug. 26-30, 2019.

Non-Final Rejection dated Sep. 21, 2021 for U.S. Appl. No. 17/033,086 which is the parent application of the instant application.

Final Rejection dated Mar. 3, 2022 for U.S. Appl. No. 17/033,086 which is the parent application of the instant application.

Notice of Allowance dated Aug. 18, 2022 for U.S. Appl. No. 17/033,086 which is the parent application of the instant application.

3GPP TS 38.331, "3rd Generation Partnership Project; Technical Specification Group Radio Access Network; NR; Radio Resource Control (RRC) protocol specification (Release 15)", V15.6.0 (Jun. 2019).

3GPP TS 37.340, "3rd Generation Partnership Project; Technical Specification Group Radio Access Network; Evolved Universal Terrestrial Radio Access (E-UTRA) and NR; Multi-connectivity; Stage 2 (Release 15)", V15.6.0 (Jun. 2019).

3GPP TS 38.306, "3rd Generation Partnership Project; Technical Specification Group Radio Access Network; NR; User Equipment (UE) radio access capabilities (Release 15)", V15.6.0 (Jun. 2019).

* cited by examiner

METHOD AND APPARATUS FOR CONDITIONAL PSCELL CHANGE

CROSS-REFERENCE TO RELATED APPLICATION(S)

The present application is a continuation application of U.S. patent application Ser. No. 17/033,086, filed on Sep. 25, 2020, which claims the benefit of and priority to U.S. Provisional Patent Application Ser. No. 62/906,273, filed on Sep. 26, 2019, entitled "Conditional PSCell Addition and PSCell Change Procedure," the contents of all of which are hereby incorporated herein fully by reference into the present application for all purposes.

FIELD

The present disclosure is related to wireless communication and, more specifically, to a method for a Conditional Primary Secondary Cell Group (SCG) Cell (PSCell) Change (CPC) procedure in cellular wireless communication networks.

BACKGROUND

With the tremendous growth in the number of connected devices and the rapid increase in user/network traffic volume, various efforts have been made to improve different aspects of wireless communication for cellular wireless communication systems, such as fifth-generation (5G) New Radio (NR), by improving data rate, latency, reliability and mobility.

The 5G NR system is designed to provide flexibility and configurability to optimize the network services and types, accommodating various use cases such as enhanced Mobile Broadband (eMBB), massive Machine-Type Communication (mMTC), and Ultra-Reliable and Low-Latency Communication (URLLC).

However, as the demand for radio access continues to increase, there exists a need for further improvements in the art.

SUMMARY

The present disclosure is related to a method for a CPC procedure in a cellular wireless communication network.

According to a first aspect of the present disclosure, a master node is provided for a CPC procedure. The master node includes one or more non-transitory computer-readable media storing computer-executable instructions and at least one processor coupled to the one or more non-transitory computer-readable media. The at least one processor is configured to execute the computer-executable instructions to cause the master node to receive, from a user equipment (UE), a UE capability report indicating that the UE supports conditional reconfiguration for PSCell change; transmit, to the UE, a first conditional reconfiguration for changing from a source PSCell to a target PSCell in an SCG portion of a radio resource control (RRC) reconfiguration message, the first conditional reconfiguration including a configuration of the target PSCell and an execution condition; and receive, from the UE, a response message after the first conditional reconfiguration is applied by the UE. The first conditional reconfiguration enables the UE to evaluate the execution condition, and apply the configuration of the target PSCell and synchronize to the target PSCell after the execution condition is evaluated as satisfied.

According to an implementation of the first aspect, both the source PSCell and the target PSCell belong to a secondary node.

According to another implementation of the first aspect, the configuration of the target PSCell and the execution condition are generated by the secondary node.

According to another implementation of the first aspect, the source PSCell belongs to a source secondary node, the target PSCell belongs to a target secondary node, the configuration of the target PSCell is generated by the target secondary node, and the execution condition is generated by the source secondary node.

According to another implementation of the first aspect, the first conditional configuration further enables the UE to release all conditional reconfigurations for PSCell change stored in the UE after the first conditional reconfiguration is applied successfully.

According to another implementation of the first aspect, the first conditional configuration further enables the UE to cease evaluating all execution conditions in other conditional reconfigurations for PSCell change stored in the UE after the first conditional reconfiguration is applied.

According to another implementation of the first aspect, the first conditional reconfiguration further enables the UE to forgo detaching from the master node when applying the first conditional reconfiguration.

According to another implementation of the first aspect, the RRC reconfiguration message includes an indicator that indicates whether the first conditional reconfiguration is for the CPC procedure.

According to another implementation of the first aspect, the RRC reconfiguration message is transmitted, and the response message is received, via a signaling radio bearer 1 (SRB1).

According to a second aspect of the present disclosure, a method for a CPC procedure performed by a master node is provided. The method includes receiving, from a UE, a UE capability report indicating that the UE supports conditional reconfiguration for PSCell change; transmitting, to the UE, a first conditional reconfiguration for changing from a source PSCell to a target PSCell in an SCG portion of an RRC reconfiguration message, the first conditional reconfiguration including a configuration of the target PSCell and an execution condition; and receiving, from the UE, a response message after the first conditional reconfiguration is applied by the UE. The first conditional reconfiguration enables the UE to evaluate the execution condition, and apply the configuration of the target PSCell and synchronize to the target PSCell after the execution condition is evaluated as satisfied.

BRIEF DESCRIPTION OF THE DRAWINGS

Aspects of the disclosure are best understood from the following detailed disclosure when read with the accompanying drawings. Various features are not drawn to scale. Dimensions of various features may be arbitrarily increased or reduced for clarity of discussion.

DESCRIPTION

Figure 1:
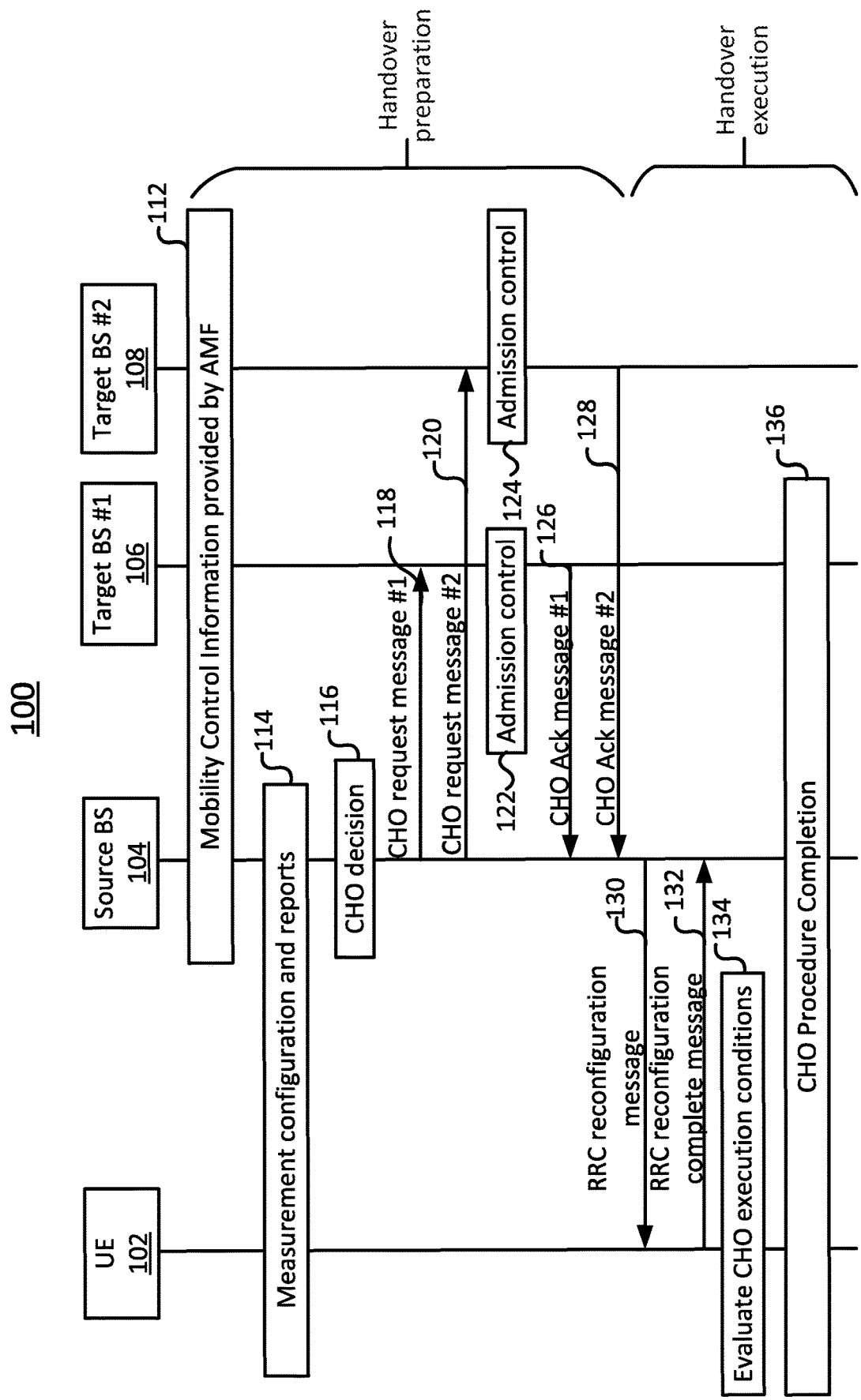
FIG. 1 illustrates a conditional handover procedure according to an example implementation of the present disclosure.

The following contains specific information related to implementations of the present disclosure. The drawings and their accompanying detailed disclosure are merely directed to implementations. However, the present disclosure is not limited to these implementations. Other variations and implementations of the present disclosure will be obvious to those skilled in the art.

Unless noted otherwise, like or corresponding elements among the drawings may be indicated by like or corresponding reference numerals. Moreover, the drawings and illustrations in the present disclosure are generally not to scale and are not intended to correspond to actual relative dimensions.

For consistency and ease of understanding, like features may be identified (although, in some examples, not illustrated) by the same numerals in the drawings. However, the features in different implementations may be different in other respects and shall not be narrowly confined to what is illustrated in the drawings.

The phrases "in one implementation," or "in some implementations," may each refer to one or more of the same or different implementations. The term "coupled" is defined as connected, whether directly or indirectly through intervening components, and is not necessarily limited to physical connections. The term "comprising" means "including, but not necessarily limited to" and specifically indicates open-ended inclusion or membership in the so-described combination, group, series, or equivalent. The expression "at least one of A, B, and C" or "at least one of the following: A, B, and C" means "only A, or only B, or only C, or any combination of A, B and C."

The terms "system" and "network" may be used interchangeably. The term "and/or" is only an association relationship for describing associated objects and represents that three relationships may exist such that A and/or B may indicate that A exists alone, A and B exist at the same time, or B exists alone. The character "/" generally represents that the associated objects are in an "or" relationship.

For the purposes of explanation and non-limitation, specific details, such as functional entities, techniques, protocols, and standards, are set forth for providing an understanding of the present disclosure. In other examples, detailed disclosure of well-known methods, technologies, systems, and architectures are omitted so as not to obscure the present disclosure with unnecessary details.

Persons skilled in the art will immediately recognize that any network function(s) or algorithm(s) disclosed may be implemented by hardware, software, or a combination of software and hardware. Disclosed functions may correspond to modules which may be software, hardware, firmware, or any combination thereof.

A software implementation may include computer-executable instructions stored on a computer-readable medium, such as memory or other types of storage devices. One or more microprocessors or general-purpose computers with communication processing capability may be programmed with corresponding executable instructions and perform the disclosed network function(s) or algorithm(s).

The microprocessors or general-purpose computers may include Application-Specific Integrated Circuits (ASICs), programmable logic arrays, and/or one or more Digital Signal Processor (DSPs). Although some of the disclosed implementations are oriented to software installed and executing on computer hardware, alternative implementations implemented as firmware, as hardware, or as a combination of hardware and software are well within the scope of the present disclosure. The computer readable medium includes, but is not limited to, Random Access Memory (RAM), Read Only Memory (ROM), Erasable Programmable Read-Only Memory (EPROM), Electrically Erasable Programmable Read-Only Memory (EEPROM), flash memory, Compact Disc Read-Only Memory (CD-ROM), magnetic cassettes, magnetic tape, magnetic disk storage, or any other equivalent medium capable of storing computer-readable instructions.

A radio communication network architecture such as a Long-Term Evolution (LTE) system, an LTE-Advanced (LTE-A) system, an LTE-Advanced Pro system, or a 5G NR Radio Access Network (RAN) typically includes at least one base station (BS), at least one UE, and one or more optional network elements that provide connection within a network. The UE communicates with the network such as a Core Network (CN), an Evolved Packet Core (EPC) network, an Evolved Universal Terrestrial RAN (E-UTRAN), a 5G Core (5GC), or an internet via a RAN established by one or more BSs.

A UE may include, but is not limited to, a mobile station, a mobile terminal or device, or a user communication radio terminal. The UE may be a portable radio equipment that includes, but is not limited to, a mobile phone, a tablet, a wearable device, a sensor, a vehicle, or a Personal Digital Assistant (PDA) with wireless communication capability. The UE is configured to receive and transmit signals over an air interface to one or more cells in a RAN.

The BS may be configured to provide communication services according to at least a Radio Access Technology (RAT), such as Worldwide Interoperability for Microwave Access (WiMAX), Global System for Mobile communications (GSM) that is often referred to as 2G, GSM Enhanced Data rates for GSM Evolution (EDGE) RAN (GERAN), General Packet Radio Service (GPRS), Universal Mobile Telecommunication System (UMTS) that is often referred to as 3G based on basic wideband-code division multiple access (W-CDMA), high-speed packet access (HSPA), LTE, LTE-A, evolved LTE (eLTE) that is LTE connected to 5GC, NR (often referred to as 5G), and/or LTE-A Pro. However, the scope of the present disclosure is not limited to these protocols.

The BS may include, but is not limited to, a node B (NB) in the UMTS, an evolved node B (eNB) in LTE or LTE-A, a radio network controller (RNC) in UMTS, a BS controller (BSC) in the GSM/GERAN, a next generation (ng)-eNB in an Evolved Universal Terrestrial Radio Access (E-UTRA) BS in connection with 5GC, a next generation Node B (gNB) in the 5G-RAN, or any other apparatus capable of controlling radio communication and managing radio resources within a cell. The BS may serve one or more UEs via a radio interface.

The BS is operable to provide radio coverage to a specific geographical area using a plurality of cells forming the RAN. The BS supports the operations of the cells. Each cell is operable to provide services to at least one UE within its radio coverage.

Each cell (often referred to as a serving cell) provides services to serve one or more UEs within its radio coverage such that each cell schedules the downlink (DL) and optionally uplink (UL) resources to at least one UE within its radio coverage for DL and optionally UL packet transmissions. The BS can communicate with one or more UEs in the radio communication system via the plurality of cells.

A cell may allocate sidelink (SL) resources for supporting Proximity Service (ProSe) or Vehicle to Everything (V2X) service. Each cell may have overlapped coverage areas with other cells.

As previously disclosed, the frame structure for NR supports flexible configurations for accommodating various next generation (e.g., 5G) communication requirements, such as Enhanced Mobile Broadband (eMBB), Massive Machine Type Communication (mMTC), and Ultra-Reliable and Low-Latency Communication (URLLC), while fulfilling high reliability, high data rate, and low latency requirements. The Orthogonal Frequency-Division Multiplexing (OFDM) technology in the 3rd Generation Partnership Project (3GPP) may serve as a baseline for an NR waveform. The scalable OFDM numerology, such as adaptive sub-carrier spacing, channel bandwidth, and Cyclic Prefix (CP), may also be used.

Two coding schemes are considered for NR, specifically Low-Density Parity-Check (LDPC) code and Polar Code. The coding scheme adaption may be configured based on channel conditions and/or service applications.

When a transmission time interval (TTI) of a single NR frame includes DL transmission data, a guard period, and UL transmission data, the respective portions of the DL transmission data, the guard period, and the UL transmission data may be configured based on the network dynamics of NR. SL resources may also be provided in an NR frame to support ProSe services or V2X services.

Examples of some terms used in the present disclosure are given below.

Multi Radio Dual Connectivity (MR-DC)
NR-NR Dual Connectivity (NR-DC)
E-UTRA-NR Dual Connectivity (EN-DC)
NR-E-UTRA Dual Connectivity (NE-DC)
NG-RAN E-UTRA-NR Dual Connectivity (NGEN-DC)

Primary Cell (PCell): PCell is the master cell group (MCG) cell, operating on the primary frequency, in which the UE either performs the initial connection establishment procedure or initiates the connection re-establishment procedure. PCell is the special cell (SpCell) of the MCG.

Primary SCG Cell (PSCell): For dual connectivity (DC) operation, PSCell is the secondary cell group (SCG) cell in which the UE performs random access when performing the Reconfiguration with Sync procedure. PSCell is the SpCell of the SCG. In some implementations, the term PSCell may refer to a Primary Secondary Cell. The term "Primary SCG Cell" and the term "Primary Secondary Cell" may be used interchangeably in the present disclosure.

Special Cell (SpCell): For DC operation the term Special Cell (SpCell) refers to the PCell of the MCG or the PSCell of the SCG; otherwise, the term Special Cell refers to the PCell.

Secondary Cell (SCell): For a UE configured with carrier aggregation (CA), an SCell is a cell providing additional radio resources on top of a Special Cell.

Serving Cell: For a UE in the RRC_CONNECTED state not configured with CA/DC, there is only one serving cell including the primary cell. For a UE in the RRC_CONNECTED state configured with CA/DC, the term "serving cells" is used to denote the set of cells including the Special Cell(s) and all secondary cells.

Master Cell Group (MCG): In MR-DC, MCG is a group of serving cells associated with the Master Node, including the SpCell (PCell) and optionally one or more SCells.

Master Node (MN): In MR-DC, MN is the radio access node that provides the control plane connection to the core network. It may be a Master eNB (in EN-DC), a Master ng-eNB (in NGEN-DC), or a Master gNB (in NR-DC and NE-DC).

Secondary Cell Group (SCG): In MR-DC, SCG is a group of serving cells associated with the Secondary Node, including the SpCell (PSCell) and optionally one or more SCells.

Secondary Node (SN): In MR-DC, SN is the radio access node, with no control plane connection to the core network, providing additional resources to the UE. It may be an en-gNB (in EN-DC), a Secondary ng-eNB (in NE-DC), or a Secondary gNB (in NR-DC and NGEN-DC).

In a wireless communication network, such as E-UTRAN, one of the main causes of handover (HO) failure is a UE not receiving a Handover Command message from a source base station (e.g., a source eNB or a source gNB) or a serving base station (e.g., a serving eNB or a serving gNB). A conventional handover procedure is usually triggered by a measurement report from the UE. For example, when the serving cell's quality (e.g., signal strength and/or service quality) is below a preconfigured threshold and a neighboring cell's quality (e.g., signal strength and/or service quality) is above a preconfigured threshold, the UE may send a measurement report to the source base station under the serving cell based on the received measurement configurations. Upon receiving the measurement report, the source base station may send a Handover Request message to multiple target base stations (e.g., eNB or gNB) for admission control, and receive Handover Acknowledgement messages from the target base stations. The source base station may select and send a Handover Command message (which may be included in a Handover Acknowledgement message from one of the target base stations) to the UE so that the UE can connect to the target cell.

The success of the overall handover procedure depends on several factors. One of the factors is that the serving cell quality does not drop rapidly within a short period of time, which may be dominated by the latency of the backhaul (e.g., for X2/Xn/Xx interface), the processing time of target base stations, and the signaling transmission time. Unfortunately, in a real-world situation, the serving cell quality can drop very quickly within a short period of time, and the UE may not successfully receive the Handover Command message before the serving cell quality drops significantly. As a result, the UE may detect a radio link failure. Consequently, in response to the detected radio link failure, the UE may initiate a radio resource control (RRC) Connection Re-establishment procedure, which in turn leads to a considerable amount of service interruption time. In a next-generation wireless network (e.g., a 5G NR network), with massive antenna beamforming in higher frequency bands, a serving cell quality may degrade even faster, especially when narrow beams are used to serve the UE. Blockage is another unavoidable problem in NR deployments.

The 3GPP has introduced the concept of conditional handover (CHO) to improve reliability of the overall handover procedure. The CHO procedure may be viewed as a supplementary procedure to the conventional handover procedure to help reduce the handover failure rate.

To execute a conditional reconfiguration command, a UE may evaluate the triggering condition(s) associated with the conditional reconfiguration command to determine whether one or more triggering conditions (or execution conditions) for the conditional reconfiguration command are met. When the UE determines that a triggering condition is satisfied, the UE may apply the corresponding conditional reconfiguration command to connect to the target cell. Existing measurement events (e.g., A3 and A5, described in greater detail below) may be used for determining whether a triggering condition of a conditional reconfiguration command is satisfied.

CHO may help to improve reliability of the overall handover procedure. Applying concepts similar to CHO may also be beneficial to a PSCell addition procedure, a PSCell change procedure, an SN addition procedure, or an SN change procedure for MR-DC mode because preparation between the MN and the SN and RRC signaling to add the SN may finish in advance.

A UE may behave differently when concepts of CHO (or conditional configuration) are applied to a normal HO (e.g., PCell change) procedure or a PSCell addition/change (or SN addition/change) procedure. For example, the UE may not need to release the link to the current PCell (or MN) if the executed conditional reconfiguration command is for PSCell addition/change. Some information or guideline (e.g., by implicit manner) for the UE to determine what to do when a conditional reconfiguration command is executed may be required. In addition, the principles for applying CHO (or conditional configuration) to PCell change and the principles for applying CHO (or conditional configuration) to PSCell addition/change may be different due to different purposes being involved. The UE behavior for different types of CHO (or conditional configuration) may need to be identified. Furthermore, some modifications for the PSCell addition procedure, the PSCell change procedure, the SN addition procedure, or the SN change procedure in MR-DC mode may be required when the CHO procedure (or the conditional reconfiguration procedure) is involved.

Therefore, implementations related to conditional PSCell addition (CPA) procedures and conditional PSCell change (CPC) procedures for intra-SN and inter-SN cases are provided in the present disclosure. Methods for a UE to determine what to do when a conditional reconfiguration command is executed, and the corresponding UE behavior, are also provided in the present disclosure.

Introduction of Conditional Reconfiguration

A conditional reconfiguration procedure may be a reconfiguration procedure executed by the UE when one or more execution conditions (also referred to as triggering conditions) are met. There are three types of conditional reconfiguration. The first type is conditional reconfiguration for PCell change, also referred to as conditional reconfiguration for handover or conditional handover (CHO). The second type is conditional reconfiguration for PSCell change, also referred to as conditional PSCell change (CPC). The third type is conditional reconfiguration for PSCell addition, also referred to as conditional PSCell addition (CPA).

CHO may be a handover procedure that is executed by the UE when one or more handover execution conditions are met. The UE may start evaluating the execution condition(s) upon receiving the CHO configuration and may stop evaluating the execution condition(s) once the execution condition(s) is met. In some implementations, an execution condition may include, for example, A3/A5 events. In some implementations, an execution condition may include one or two trigger condition(s).

FIG. 1 illustrates a conditional handover procedure 100 according to an example implementation of the present disclosure. A source BS 104, a target BS #1 106, and a target BS #2 108 may be gNBs or any combination of other types of BSs. For example, any of the source BS 104, the target BS #1 106, and the target BS #2 108 may be an eNB in some implementations. An Access and Mobility Management Function (AMF) and a User Plane Function (UPF) may be used in a 5G system. The AMF and the UPF are not illustrated in FIG. 1. The conditional handover procedure 100 may be an intra-AMF/UPF CHO procedure.

In action 112, the AMF may provide mobility control information to the source BS 104, the target BS #1 106, and the target BS #2 108. A UE 102 is served by the source BS 104. The UE context within the source BS 104 may contain information regarding roaming and access restrictions which were provided either at connection establishment or at the last Tracking Area (TA) update. In action 114, the source BS 104 may configure the UE 102 with a measurement configuration and the UE 102 may report to the source BS 104 according to the measurement configuration. In action 116, the source BS 104 may decide to use CHO after receiving measurement reports from the UE 102.

The source BS 104 may send a corresponding CHO Request message to each of the potential target BSs. The source BS 104 may send CHO Request message #1 to the target BS #1 106 in action 118. The source BS 104 may also send CHO Request message #2 to the target BS #2 108 in action 120.

In actions 122 and 124, the target BS #1 106 and the target BS #2 108, respectively, may perform admission control procedures. In one implementation, slice-aware admission control may be performed if the slice information is sent to the corresponding target BS. In one implementation, the target BS may reject protocol data unit (PDU) sessions if the PDU sessions are associated with non-supported slices.

In action 126, the target BS #1 106 may send CHO Acknowledgement (Ack) message #1 to the source BS 104 when the target BS #1 106 accepts the CHO request from the source BS 104. The CHO Ack message #1 may include configuration of CHO candidate cell(s) of the target BS #1 106. Similarly, in action 128, the target BS #2 108 may send CHO Ack message #2 to the source BS 104 when the target BS #2 108 accepts the CHO request from the source BS 104. The CHO Ack message #2 may include configuration of CHO candidate cell(s) of the target BS #2 108.

The source BS 104 may send an RRC Reconfiguration message to the UE 102 in action 130. The RRC Reconfiguration message may include a CHO configuration, such as at least one CHO candidate cell and at least one CHO execution condition. The UE 102 may send an RRC Reconfiguration Complete message to the source BS 104 in action 132.

The UE 102 may maintain connection with the source BS 104 after receiving the CHO configuration. In action 134, the UE 102 may start evaluating the CHO execution conditions for the candidate cell(s). If at least one CHO candidate cell (e.g., a candidate cell of the target BS #1 106) satisfies the corresponding CHO execution condition, the UE may detach from the source BS, apply the stored corresponding configuration for the selected candidate cell, and synchronize to that candidate cell.

In action 136, the UE 102 may synchronize to the target cell and may complete the CHO procedure by sending an RRC Reconfiguration Complete message to the target BS #1 106. In some implementations, data forwarding and/or a path switch procedure may be performed after action 136.

Determination of Conditional Reconfiguration and UE Behavior

In some implementations, a conditional reconfiguration command (e.g., an RRC Reconfiguration message containing conditional reconfiguration, such as including configuration(s) of candidate cell(s) and execution condition(s)) may be associated with an indicator (or related information) to indicate that the conditional reconfiguration command is for normal HO (e.g., PCell change), PSCell addition/change, intra-SN PSCell change, or inter-SN PSCell change.

In some implementations, a conditional reconfiguration command including configuration(s) of candidate cell(s) and execution condition(s)) may be included in an MCG portion/part of an RRC Reconfiguration message or an SCG portion/part (e.g., in the container) of an RRC Reconfiguration message. In some implementations, a conditional reconfiguration command in the MCG portion/part of the RRC Reconfiguration message may imply/indicate that the conditional reconfiguration command is for normal HO (e.g., PCell change). In some implementations, a conditional reconfiguration command in the SCG portion/part of the RRC Reconfiguration message (e.g., in a container for SCG or in an mrdc-SecondaryCellGroup Information Element) may imply/indicate that the conditional reconfiguration command is for PSCell addition/change, intra-SN PSCell change, and/or inter-SN PSCell change. Note that a conditional reconfiguration command may be in the form of an RRC Reconfiguration message. The terms "MCG part" and "MCG portion" may be used interchangeably in the present disclosure. Likewise, the terms "SCG part" and "SCG portion" may be used interchangeably in the present disclosure.

In some implementations, a cell list with target cell identifiers (IDs) (or the corresponding physical cell ID (PCI)) may be associated with conditional reconfiguration for HO or conditional reconfiguration for PSCell addition/change in a conditional reconfiguration command regardless of whether the conditional reconfiguration command is received from an MCG or an SCG.

In some implementations, an execution condition may be defined by a measurement ID (or a measure ID/measID) that identifies a measurement configuration. In some implementations, if a conditional reconfiguration command includes an execution condition defined by a measurement ID and the measurement ID is associated with a report configuration of an A3 event with the PCell as the target, the conditional reconfiguration command may be considered as a CHO (or conditional PCell change). If a conditional reconfiguration command includes an execution condition defined by a measurement ID and the measurement ID is associated with a report configuration of an A3 event with the PSCell as the target, the conditional reconfiguration command may be considered as a CPA or CPC. In some implementations, if a conditional reconfiguration command includes an execution condition defined by a measurement ID and the measurement ID is associated with a report configuration of an A5 event with the PCell as the target, the conditional reconfiguration command may be considered as a CHO. If a conditional reconfiguration command includes an execution condition defined by a measurement ID and the measurement ID is associated with a report configuration of an A5 event with the PSCell as the target, the conditional reconfiguration command may be considered as a CPA or CPC.

In some implementations, if an associated execution condition of a conditional reconfiguration command is set by an MN, the conditional reconfiguration command may be regarded as a CHO or conditional PCell change. In some implementations, if an associated execution condition of a conditional reconfiguration command is set by an SN, the conditional reconfiguration command may be regarded as a CPA or CPC, such as an intra-SN PSCell change.

In some implementations, if a conditional reconfiguration command for PCell change is executed (e.g., an associated execution condition is satisfied) by a UE, the UE may not send a response/bye message to the PCell (or the MN). The response/bye message may be used to notify the execution of the conditional reconfiguration command.

It should be noted that "a conditional reconfiguration command is executed" may mean that "a conditional reconfiguration that is associated with the conditional reconfiguration command is applied" in the present disclosure. The following expressions "a conditional configuration command is executed," "a conditional configuration command is applied," "a conditional configuration is executed," and "a conditional reconfiguration is applied" may be used interchangeably in the present disclosure. Moreover, the expression "a conditional reconfiguration command is executed" used in the present disclosure may mean "the conditional reconfiguration command is being executed" or "the conditional reconfiguration command has been executed." Likewise, the expression "a conditional reconfiguration is applied" used in the present disclosure may mean "the conditional reconfiguration is being applied" or "the conditional reconfiguration has been applied."

In some implementations, if a conditional reconfiguration command for PCell change is executed (e.g., an associated execution condition is satisfied) by a UE, the UE may release the link to the PSCell (or the MN). In one implementation, the UE may release the link after the conditional reconfiguration command (or the CHO procedure) is successfully executed.

In some implementations, if a conditional reconfiguration command for PCell change is executed (e.g., an associated execution condition is satisfied) by a UE, the UE may release the (stored) conditional reconfiguration command(s) after the conditional reconfiguration command is successfully executed. In one implementation, the UE may release the (stored) conditional reconfiguration command(s) after the UE sends a complete message to the target cell.

In some implementations, if a conditional reconfiguration command for PCell change is executed (e.g., an associated execution condition is satisfied) by a UE, the UE may stop evaluating the triggering condition of other candidate cell(s) during execution of the conditional reconfiguration for PCell change.

In some implementations, if a conditional reconfiguration command for PCell change is executed (e.g., an associated execution condition is satisfied) by a UE, the UE may stop evaluating the triggering condition(s) of conditional reconfiguration for PSCell addition/change.

In some implementations, if a conditional reconfiguration command for PCell change is executed (e.g., an associated execution condition is satisfied) by a UE, the UE may continue evaluating the triggering condition(s) of conditional reconfiguration for PSCell addition/change.

In some implementations, if a conditional reconfiguration command for PCell change is executed (e.g., an associated execution condition is satisfied) by a UE, a network (NW) command may indicate whether to continue evaluating the triggering condition(s) of conditional reconfiguration for PSCell addition/change.

In some implementations, if a conditional reconfiguration command for PSCell addition/change is executed (e.g., an associated execution condition is satisfied) or the associated conditional reconfiguration is applied by a UE, the UE may send a response/bye message to the PCell (or the MN). The response/bye message may be used to notify the execution of the conditional reconfiguration command. In some implementations, the response/bye message may include information of at least one of the cell ID of the target PSCell, the target SN, and the conditional reconfiguration command ID, but not limited thereto. In some implementations, when receiving the response/bye message, the PCell (or the MN) may release the source SN, if required.

In some implementations, if a conditional reconfiguration command for PSCell addition/change is executed (e.g., an associated execution condition is satisfied) or the associated conditional reconfiguration is applied by a UE, the UE may keep the link to the PCell (or the MN). In some implementation, a conditional reconfiguration command may be associated with a conditional reconfiguration command ID.

In some implementations, if a conditional reconfiguration command for PSCell addition/change is executed (e.g., an associated execution condition is satisfied) by a UE, the UE may send a response/bye message to the source PSCell (or the source SN). For example, if SRB3 is configured, the UE may send a response/bye message to the source PSCell (or the source SN) via SRB3 if the conditional reconfiguration command for PSCell addition/change is executed. The response/bye message may be used to notify the execution of the conditional reconfiguration command. In some implementations, the response/bye message may include information of at least one of the cell ID of the target PSCell, the target SN, and the conditional reconfiguration command ID, but not limited thereto. In some implementations, when receiving the response/bye message, the source PSCell (or the source SN) may inform the MN, if required. In some implementations, when receiving the response/bye message, the source PSCell (or the source SN) may release the UE context.

In some implementations, if a conditional reconfiguration command for PSCell addition/change is executed (e.g., an associated execution condition is satisfied) by a UE, the UE may keep the link to the source PSCell (or the source SN). In some implementations, the UE may release the link to the source PSCell (or the source SN) based on a NW command.

In some implementations, if a conditional reconfiguration command for PSCell addition/change is executed (e.g., an associated execution condition is satisfied) or the associated conditional reconfiguration is applied by a UE, the UE may release the (stored) conditional reconfiguration command(s) for PSCell addition/change after the conditional reconfiguration command (or the corresponding CPC/CPA procedure) is successfully executed. In one implementation, the conditional reconfiguration command (or the corresponding CPC/CPA procedure) is successfully executed when the UE sends a complete message to the target cell. For example, the UE may send the complete message to the target cell via SRB3 if SRB3 is configured. For example, if SRB3 is not configured, the UE may send the complete message embedded in RRC signaling via SRB1 to the MN first, then the MN may deliver the embedded complete message to the target cell (or the associated target SN).

In some implementations, if a conditional reconfiguration command for PSCell addition/change is executed (e.g., an associated execution condition is satisfied) by a UE, the UE may keep the (stored) conditional reconfiguration command(s) for PCell change after the conditional reconfiguration command (or the corresponding CPC/CPA procedure) is successfully executed. In one implementation, the conditional reconfiguration command (or the corresponding CPC/CPA procedure) is successfully executed when the UE sends a complete message to the target cell.

In some implementations, if a conditional reconfiguration command for PSCell addition/change is executed (e.g., an associated execution condition is satisfied) by a UE, the UE may release the (stored) conditional reconfiguration command(s) for PCell change after the target PSCell (or target SN or source MN) sends a NW command (e.g., a new conditional reconfiguration command or a reconfiguration message) from the target SN to the UE.

In some implementations, if a conditional reconfiguration command for PSCell addition/change is executed (e.g., an associated execution condition is satisfied) by a UE, the UE may release all the (stored) conditional reconfiguration command(s) after the conditional reconfiguration command for PSCell addition/change (or the corresponding CPC/CPA procedure) is successfully executed regardless of the types/purposes of the (stored) conditional reconfiguration command(s). In one implementation, the conditional reconfiguration command is successfully executed when the UE sends a complete message to the target cell.

In some implementations, if a conditional reconfiguration command for PSCell addition/change is executed (e.g., an associated execution condition is satisfied) by a UE, the UE may continue evaluating the triggering condition(s) of conditional reconfiguration for PCell change.

In some implementations, if a conditional reconfiguration command for PSCell addition/change is executed (e.g., an associated execution condition is satisfied) by a UE, the UE may stop evaluating the triggering condition(s) of conditional reconfiguration for PCell change.

In some implementations, if a conditional reconfiguration command for PSCell addition/change is executed/is being executed/has been executed (e.g., an associated execution condition is satisfied or PSCell change is triggered) or the associated conditional reconfiguration is applied/is being applied/has been applied by a UE, the UE may stop evaluating the triggering condition(s) of other candidate PSCell(s) for PSCell addition/change.

In some implementations, if a conditional reconfiguration command for PSCell addition/change is executed (e.g., an associated execution condition is satisfied) by a UE, the UE may continue evaluating the triggering condition(s) of other candidate cell(s) for PSCell addition/change.

In some implementations, the previously disclosed UE behavior (if a conditional reconfiguration command for PSCell addition/change is executed) may be optionally applied based on the channel quality of the MN. For example, if the cell level quality of the MN is higher than a threshold, the UE may stop evaluating the triggering condition(s) of other candidate cell(s) for PSCell addition/change.

In some implementations, a UE may release the stored conditional reconfiguration command for PSCell addition/change by a NW command (e.g., via a reconfiguration). The UE may not autonomously release any stored conditional reconfiguration command(s) for PSCell addition/change even if a normal HO (e.g., PCell change) is completed. The UE may not autonomously release any stored conditional reconfiguration command(s) for PSCell addition/change even if a PSCell addition/change is completed.

Principles Applied to Conditional Reconfiguration

In some implementations, a conditional reconfiguration command for PCell change may contain configuration(s) of CHO candidate cell(s) generated by candidate base station(s) and execution condition(s) generated by source base station(s). In some implementations, upon executing a conditional reconfiguration command for PCell change, a UE may not monitor the source cell. In some implementations, upon executing a conditional reconfiguration command for PCell change, a UE may not monitor the source PCell. In some implementations, upon executing a conditional reconfiguration command for PCell change, a UE may not monitor the serving cell(s) or the secondary cells. In some implementations, an execution condition of a conditional reconfiguration command for PCell change may include, for example, A3/A5 measurement events. Note that an A3 event is for measuring if the quality of a neighbor cell is higher than the quality of the SpCell by an offset amount. Event A5 is for measuring if the quality of the SpCell is lower than an absolute threshold #1 and the quality of a neighbor cell is higher than another absolute threshold #2. The A3 event and the A5 event may be with reference to 3GPP Technical Specification (TS) 38.331.

In some implementations, a UE may maintain connection with a source base station (e.g., MN and/or SN, if already in MR-DC mode) after receiving conditional reconfiguration command(s) (or CHO configurations) for PCell change and may start evaluating execution conditions for the candidate cell(s). If at least one candidate cell satisfies the corresponding execution condition and the candidate cell is for PCell change, the UE may detach from the source base station, apply the stored corresponding configuration for the selected candidate cell, and synchronize to that candidate cell.

In some implementations, a conditional reconfiguration command for PSCell addition/change may contain configuration(s) of candidate cell(s) generated by candidate base station(s) (e.g., candidate SN(s)) and execution condition(s) generated by an MN. In some implementations, a conditional reconfiguration command for PSCell addition/change may contain configuration(s) of candidate cell(s) generated by candidate base station(s) (e.g., candidate SN(s)) and execution condition(s) generated by an MN or an SN (e.g., the UE is already in MR-DC mode).

In some implementations, a source SN may decide to use conditional reconfiguration for PSCell addition/change (e.g., based on the received measurement results or the cell loading). In some implementations, a source MN may decide to use conditional reconfiguration for PCell change, conditional reconfiguration for PSCell addition/change, or both. For example, for an SN-initiated SN change procedure, the source SN may provide the associated execution condition(s) for a conditional reconfiguration command. In some implementations, upon executing a conditional configuration command for PSCell addition/change, the UE may keep monitoring the source cell.

In some implementations, an execution condition of a conditional reconfiguration command for PSCell addition/change may include, for example, A3/A5 measurement events or, for example, a B1 measurement event. In some implementations, an execution condition of a conditional reconfiguration command for PSCell addition/change may include, for example, a B1 measurement event. In some implementations, an execution condition of a conditional reconfiguration command for PSCell change may include A3/A5 measurement. Note that the B1 event is for measuring if the quality of an inter-RAT neighboring cell is higher than a threshold. For example, for a conditional reconfiguration for inter-SN PSCell change, the MN may configure an execution condition related to a B1 event together with a configuration of a candidate cell(s) generated by a candidate SN.

In some implementations, a UE may maintain connection with a source base station (e.g., MN and/or SN, if already in MR-DC mode) after receiving conditional reconfiguration for PSCell addition/change and may start evaluating execution conditions for the candidate cell(s). If at least one candidate cell satisfies the corresponding execution condition and the candidate cell is for PSCell addition/change, the UE may not detach from the source base station (e.g., MN). The UE may apply the stored corresponding configuration for the selected candidate cell and may synchronize to that candidate cell for the corresponding PSCell addition/change procedure.

UE Capability

In some implementations, a UE may transmit a UE capability report to the NW (e.g., the MN) to indicate that the UE supports the conditional reconfiguration. The UE capability report may indicate that the UE supports both conditional reconfiguration for PCell change and conditional reconfiguration for PSCell addition/change. In some implementations, a UE may transmit a UE capability report to the NW (e.g., the MN) to indicate that the UE supports the conditional reconfiguration for PCell change. The UE may transmit another UE capability report to the NW (e.g., the MN) to indicate that the UE supports the conditional reconfiguration for PSCell addition/change.

In some implementations, a UE may transmit a UE capability report to the NW to indicate that the UE supports the conditional reconfiguration on LTE (or E-UTRA). This capability may indicate that the UE supports both conditional reconfiguration for PCell change and conditional reconfiguration for PSCell addition/change on LTE (or E-UTRA) (e.g., for LTE DC mode). In some implementations, the UE capability report to the NW may be transmitted in an E-UTRA capability container. In some implementations, a UE may transmit a UE capability report to the NW to indicate that the UE supports conditional reconfiguration for PCell change on LTE (or E-UTRA) and may transmit another UE capability report to the NW to indicate that the UE supports conditional reconfiguration for PSCell addition/change on LTE (or E-UTRA).

In some implementations, a UE may transmit a UE capability report to the NW to indicate that the UE supports the conditional reconfiguration on NR. This capability may indicate that the UE supports both conditional reconfiguration for PCell change and conditional reconfiguration for PSCell addition/change on NR (e.g., for NR-NR DC mode). In some implementations, the UE capability report to the NW may be transmitted in an NR capability container. In some implementations, a UE may transmit a UE capability report to the NW to indicate that the UE supports conditional reconfiguration for PCell change on NR and may transmit another UE capability report to the NW to indicate that the UE supports conditional reconfiguration for PSCell addition/change on NR.

In some implementations, the MN may forward the UE capability report that indicates support of the conditional reconfiguration to the SN.

In some implementations, a UE may transmit a UE capability report to the NW to indicate that the UE supports SN addition/change for a different RAT by using the conditional reconfiguration. For example, the UE may transmit the UE capability report to the LTE MN to indicate that the UE supports to add an NR SN by using conditional reconfiguration or the UE supports to change an NR SN by using conditional reconfiguration. For example, the UE may transmit the UE capability report to the NR MN to indicate that the UE supports adding an LTE SN by using conditional reconfiguration or the UE supports changing an LTE SN by using conditional reconfiguration. In some implementations, the UE may report different UE capabilities for SN addition/change in different MR-DC modes (e.g., EN-DC, NGEN-DC, or NE-DC), respectively.

MN-Initiated Inter-SN CPC

An SN change procedure without CPC may be initiated either by an MN or an SN. The SN change procedure may be used to transfer a UE context from a source SN to a target SN and change the SCG configuration in the UE from one SN to another SN (e.g., applying the SCG configuration from the target SN). The SN Change procedure without CPC may always involve signaling over an MCG signaling radio bearer (SRB) towards the UE.

In some implementations, for MN-initiated inter-SN CPC (e.g., adopting CPC for SN change), the MN may not initiate a release of the source SN resources including a cause indicating SCG mobility even if an allocation of the target SN resources is successful. In one implementation, the MN may not send the source SN a Release Request message before the MN-initiated inter-SN CPC is successfully executed.

In some implementations, if a stored conditional reconfiguration command for PSCell change (or SN Change) is executed, the UE may send a response/bye message to the PCell (or the MN). After receiving the response/bye message from the UE, the MN may initiate a release of the source SN (e.g., by sending an SN Release Request message). After receiving the response/bye message from the UE, the MN may notify the target SN that the conditional reconfiguration command is executed with specific information (e.g., the UE ID, target cell ID, information related to the target SN, the executed conditional reconfiguration command, or indication/information of conditional SN change, but not limited thereto). After receiving the response/bye message from the UE, the MN may forward the SN status (e.g., provided by the source SN) and/or the data (e.g., if there are some SN-terminated bearers on the source SN) to the target SN.

Figure 2:
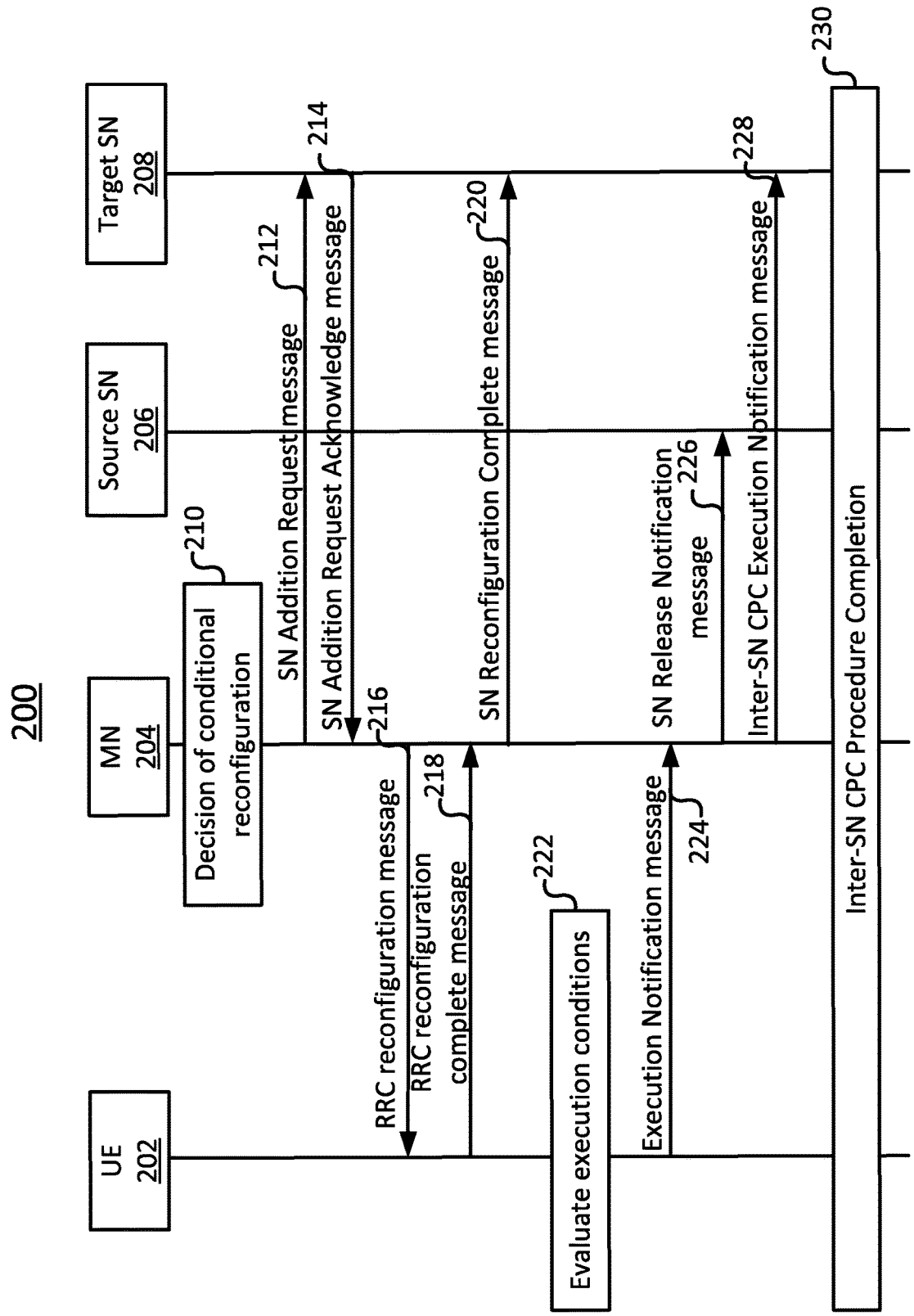
FIG. 2 illustrates a Master Node (MN)-initiated inter-Secondary Node (SN) CPC procedure according to an example implementation of the present disclosure.

FIG. 2 illustrates an MN-initiated inter-SN CPC procedure 200 according to an example implementation of the present disclosure. A UPF and an AMF may be involved if the MN-initiated inter-SN CPC is used in MR-DC with 5GC. The UPF and the AMF are not illustrated in FIG. 2. For the case of MR-DC with EPC (e.g., EN-DC mode), the UPF may be replaced by a Serving Gateway (S-GW) and the AMF may be replaced by a Mobility Management Entity (MME).

In action 210, an MN 204 may decide to initiate an inter-SN CPC procedure (also referred to as conditional reconfiguration for SN change). The inter-SN CPC procedure may cause a UE 202 to change from a PSCell in a source SN 206 to another PSCell in a target SN 208. In some implementations, the MN 204 may configure the UE 202 with measurement procedures (e.g., configuring a measurement configuration) and the UE 202 may provide measurement reports according to the measurement configuration. Based on the measurement reports received from the UE 202, the MN 204 may decide to use conditional reconfiguration for normal handover or conditional reconfiguration for SN change.

In action 212, the MN 204 may initiate the SN change by requesting the target SN 208 to allocate resources for the UE 202 via an SN Addition procedure. In some implementations, the MN 204 may include measurement results related to the target SN 208 in the SN Addition Request message in action 212. In some implementations, the SN Addition Request message in action 212 may include related information to indicate that the SN addition request is a conditional SN change request. In some implementation, if data forwarding is required, the target SN 208 may provide data forwarding addresses to the MN 204. In some implementations, the target SN 208 may include the indication to indicate whether to apply the full RRC configuration or to apply the delta RRC configuration.

In action 214, the target SN 208 may send an SN Addition Request Acknowledge message back to the MN 204 (e.g., if the request passes the Admission control of the target SN 208). In some implementations, the SN Addition Request Acknowledge message may include configuration(s) of candidate cells for the conditional reconfiguration for inter-SN CPC.

In action 216, the MN 204 may send to the UE 202 an RRC Reconfiguration message that includes one or more conditional reconfiguration command(s). Each conditional reconfiguration command may include the configuration(s) of the candidate cell(s) (e.g., candidate target PSCells) and the associated execution condition(s).

In action 218, the UE 202 may send an RRC Reconfiguration Complete message to the MN 204.

In action 220, if the RRC connection reconfiguration procedure is successful, the MN 204 may inform the target SN 208 via an SN Reconfiguration Complete message, which may include an SN RRC response message for the target SN 208, if received from the UE 202. In some other implementations, if the RRC connection reconfiguration procedure is successful, the MN 204 may not inform the target SN 208 via an SN Reconfiguration Complete message with the SN RRC response message for the target SN 208 included, if received from the UE 202.

In some implementations, the UE 202 may maintain connection with MN 204 after receiving conditional reconfiguration command(s) in action 216. In action 222, the UE 202 may start evaluating the execution conditions for the candidate cell(s). If one candidate cell satisfies the corresponding execution condition and this candidate cell is for the purpose of SN change, the UE 202 may not detach from the MN 204. The UE 202 may apply the stored corresponding configuration for the selected candidate cell and may synchronize to that candidate cell.

In action 224, the UE 202 may send a response message (e.g., an Execution Notification message) to inform the MN 204 that the conditional reconfiguration command is executed/applied. For example, the UE 202 may send the Execution Notification message to inform the MN 204 that the conditional reconfiguration command is executed after the inter-SN CPC procedure is completed. In one implementation, the UE 202 may send the Execution Notification message to inform the MN 204 that the conditional reconfiguration command is executed before the inter-SN CPC procedure is completed.

In action 226, after receiving the Execution Notification message from the UE 202, the MN 204 may send an SN Release Notification message to the source SN 206. In some implementations, the SN Release Notification message may include a cause indicating SCG Mobility. In some implementations, the SN Release Notification message may include a cause indicating conditional SCG Mobility. In some implementations, the source SN 206 may not reject the release. For example, the source SN 206 may reject the release if the cause indicates normal SCG Mobility. The source SN 206 may not reject the release if the cause indicates conditional SCG Mobility. In some implementations, if data forwarding is required, the MN 204 may provide data forwarding addresses to the source SN 206 (e.g., in the SN Release Notification message or another message). Note that the SN Release Notification message may be the same as an SN Release Request message. In some implementations, the source SN 206 may reject the SN Release Request message, but the source SN 206 may only accept the SN Release Notification message. In some implementations, the reception of the SN Release Notification message may trigger the source SN 206 to stop providing user data to the UE 202 and may start data forwarding.

In action 228, after receiving the Execution Notification message from the UE 202, the MN 204 may send an inter-SN CPC Execution Notification message to the target SN 208.

In action 230, the UE 202 may synchronize to the target cell in the target SN 208. In one implementation, the UE 202 may complete the inter-SN CPC procedure by sending an RRC Reconfiguration Complete message to target SN 208.

In some implementations, data forwarding and/or path switch procedure may be performed to complete the SN change procedure. In some implementations, for SN terminated bearers using Radio Link Control (RLC) Acknowledged Mode (AM), the source SN 206 may send the SN Status Transfer (e.g., after receiving an SN Release Notification message or an SN Release Request message) to the MN 204. The MN 204 may then send the SN Status Transfer to the target SN 208. In some implementations, the source SN 206 may send to the MN 204 the Secondary RAT Data Usage Report message, which may include data volumes delivered to and received from the UE 202 (e.g., after receiving an SN Release Notification message or an SN Release Request message). In some implementations, if the user plane resource configuration is terminated at the source SN 206, a path update procedure (or path switch procedure) may be triggered by the MN 204 (e.g., after receiving an execution notification message). In some implementations, the MN 204 may send a UE Context Release to the source SN 206 (e.g., after the path switch procedure is completed) such that the source SN 206 may release radio and control plane related resources associated with the UE context. Note that any ongoing data forwarding may continue.

Figure 3:
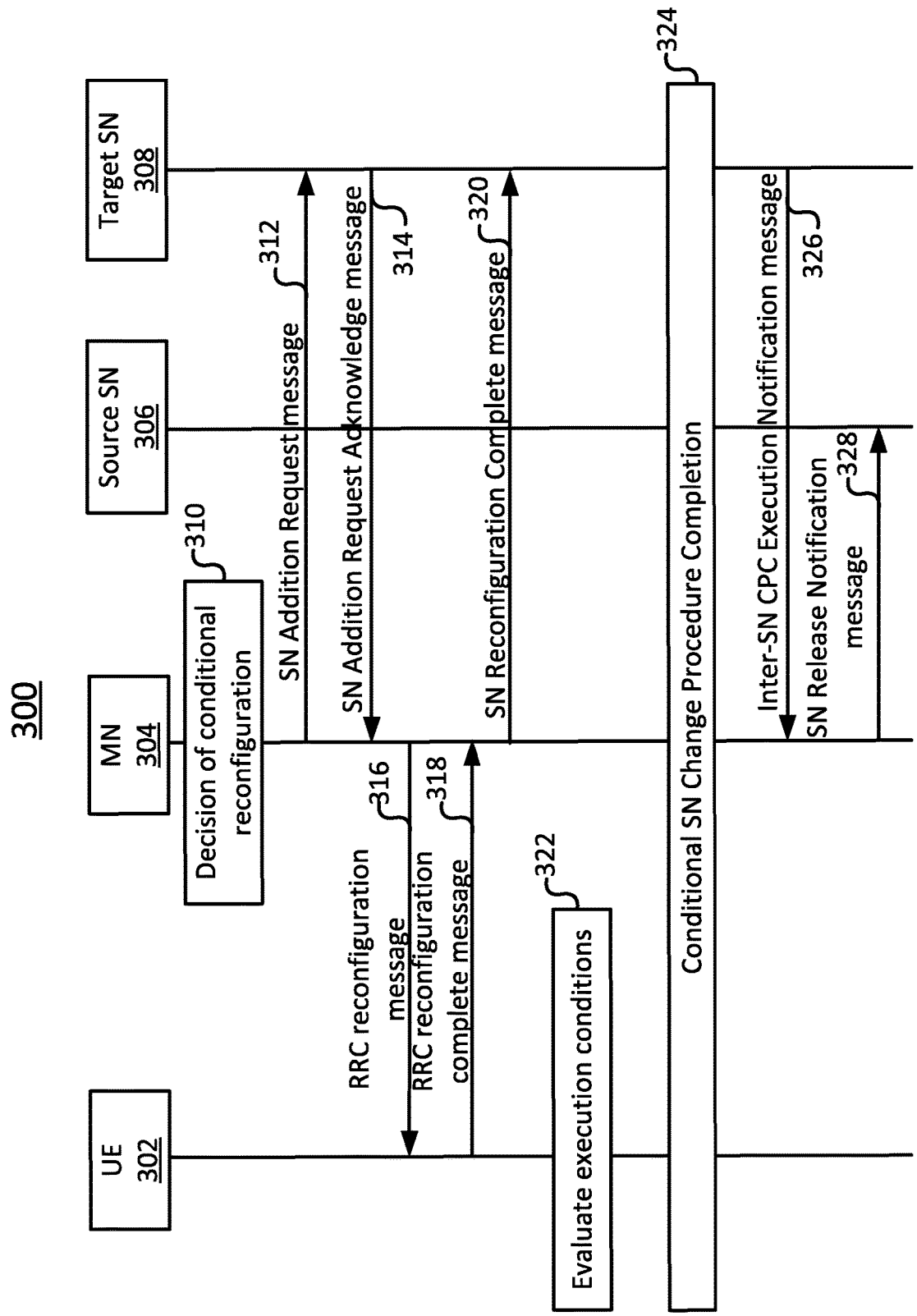
FIG. 3 illustrates an MN-initiated inter-SN CPC procedure according to another example implementation of the present disclosure.

FIG. 3 illustrates an MN-initiated inter-SN CPC procedure 300 according to another example implementation of the present disclosure. Actions 310, 312, 314, 316, 318, 320, and 322 may correspond to actions 210, 212, 214, 216, 218, 220, and 222 in FIG. 2, respectively. In some implementations, if a stored conditional reconfiguration command for PSCell change (or SN change) is executed, a UE 302 may not send a response/bye message to the PCell (or an MN 304).

In action 324, the UE 302 may synchronize to the target cell and may complete the conditional SN change procedure by sending an RRC Reconfiguration Complete message to a target SN 308. In some implementations, the RRC Reconfiguration Complete message may include specific information (e.g., the UE ID, target cell ID, information related to the target SN 308, the executed conditional reconfiguration command (ID), or indication/information of condition SN change, but not limited thereto) to indicate to the target SN 308 which related conditional reconfiguration command is executed.

After receiving the complete message (e.g., RRC Reconfiguration Complete message) from the UE 302, the target SN 308 may send a notification message (e.g., an inter-SN CPC Execution Notification message) to the MN 304 in action 326. The notification message may indicate the execution of the conditional reconfiguration command. Some information may be included in the notification message, e.g., the UE ID, target cell ID, information related to the target SN 308, the executed conditional reconfiguration command (ID), or indication/information of the condition SN change, but not limited thereto.

In some implementations, when receiving the notification message related to the execution of the conditional reconfiguration command from the target SN 308, the MN 304 may initiate a release of a source SN 306 in action 328. In some implementations, when receiving the notification message related to the execution of the conditional reconfiguration command, the MN 304 may forward the SN status (e.g., provided by the source SN 306) and/or the data (e.g., if there are some SN-terminated bearers on the source SN 306) to the target SN 308.

In some implementations, when receiving the notification message (e.g., inter-SN CPC Execution Notification message) from the target SN 308, the MN 304 may send an SN Release Notification message to the source SN 306 in action 328. The SN Release Notification message may include a cause indicating SCG Mobility. In some implementations, the SN Release Notification message may include a cause indicating conditional SCG Mobility. In some implementations, the source SN 306 may not reject the release. For example, the source SN 306 may reject the release if the cause indicates normal SCG Mobility. The source SN 306 may not reject the release if the cause indicates conditional SCG Mobility.

In some implementations, if data forwarding is required, the MN 304 may provide data forwarding addresses to the source SN 306 (e.g., within the SN Release Notification message or other messages). Note that the SN Release Notification message may be the same as an SN Release Request message. In some implementation, the source SN 306 may reject the SN Release Request message, but the source SN 306 may only accept the SN Release Notification message.

SN-Initiated Inter-SN CPC

Figure 4:
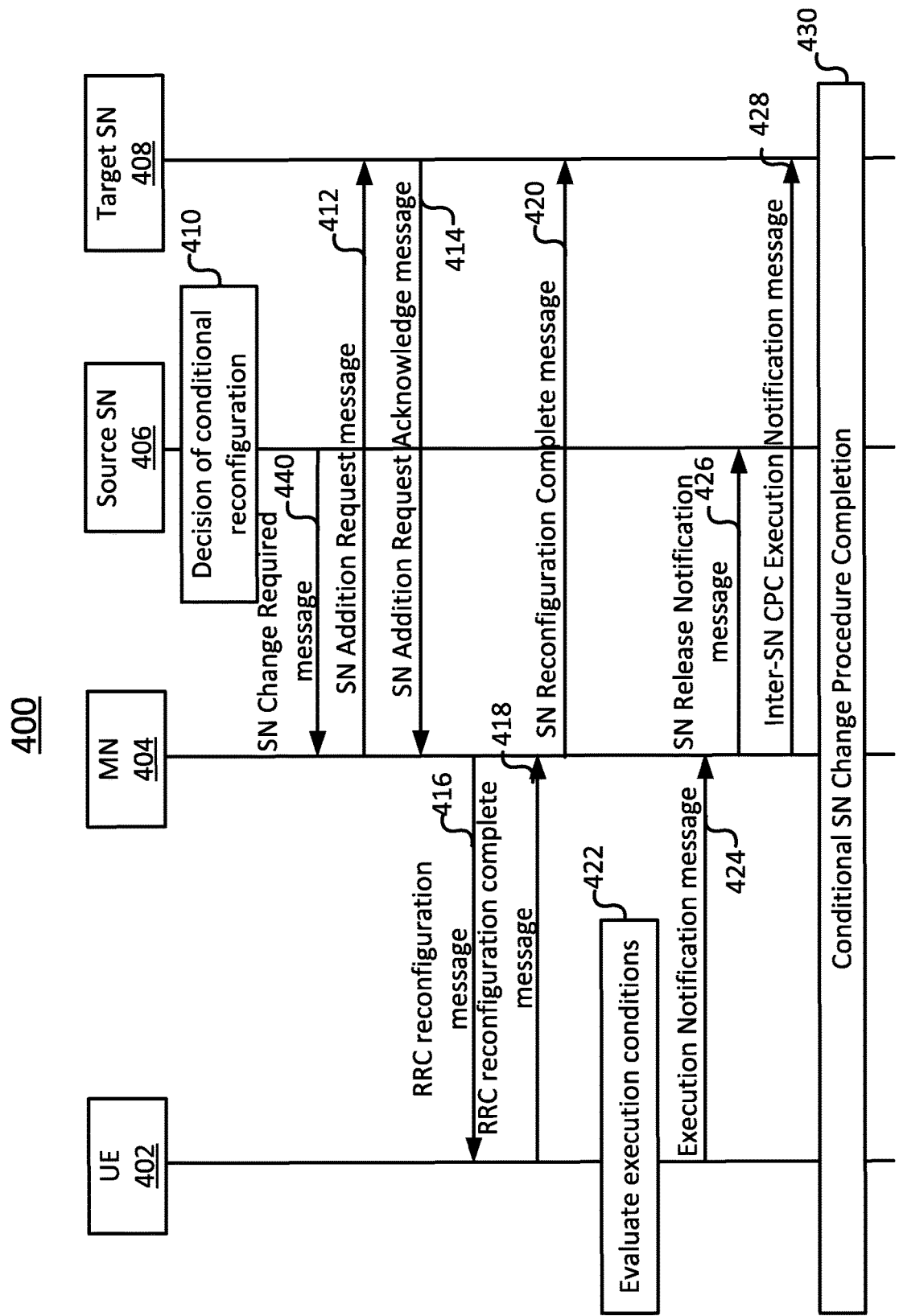
FIG. 4 illustrates an SN-initiated inter-SN CPC procedure according to an example implementation of the present disclosure.

FIG. 4 illustrates an SN-initiated inter-SN CPC procedure 400 according to an example implementation of the present disclosure. In some implementations, for SN-initiated inter-SN CPC (or SN change), an MN 404 may not initiate a release of resources of a source SN 406 including a cause indicating SCG mobility (e.g., not send the source SN a change confirm message) even if an allocation of resources of the target SN 408 is successful. In one implementation, the MN 404 may not send the source SN 406 a change confirm Request message before the SN-initiated inter-SN CPC is successfully executed.

In action 410, the source SN 406 may decide to use conditional reconfiguration for inter-SN PSCell change (or SN change). In some implementations, the source SN 406 (or the current serving SN) may configure a UE 402 with measurement procedures (e.g., configuring a measurement configuration) and the UE 402 may provide measurement reports according to the measurement configuration. Based on the measurement reports received from the UE 402, the source SN 406 may decide to use conditional reconfiguration for inter-SN PSCell change (or SN Change). In some implementations, the source SN 406 may decide to use conditional reconfiguration and may notify the MN 404. For example, the source SN 406 may inform the MN 404 to configure an MN-initiated inter-SN PSCell change. Afterward, the source SN 406 may configure the UE 402 to report (e.g., measurement results or other PSCell change related information) to the MN 404 and the MN 404 may decide to use conditional reconfiguration for inter-SN PSCell change (or SN change).

The inter-SN PSCell change procedure may cause the UE 402 to change from a PSCell in the source SN 406 to another PSCell in a target SN 408. In one implementation, the UE 402 may receive a conditional reconfiguration for PSCell change from the MN 404. The conditional reconfiguration for PSCell change may include a configuration of a target PSCell and an execution condition. In one implementation, the configuration of the target PSCell in the conditional reconfiguration for PSCell change may be generated by the target SN 408. In one implementation, the execution condition in the conditional reconfiguration for PSCell change may be generated by the source SN 406.

Actions 412, 414, 416, 418, 420, 422, 424, 426, 428, and 430 may correspond to actions 212, 214, 216, 218, 220, 222, 224, 226, 228, and 230 in FIG. 2, respectively. In action 440, the source SN 406 may initiate the SN change procedure by sending an SN Change Required message, which may include a candidate target node ID, the SCG configuration (to support delta configuration), and measurement results related to the target SN 408. In some implementations, the SN Change Required message may include related information to indicate that the SN change request is a conditional SN change request.

Figure 5:
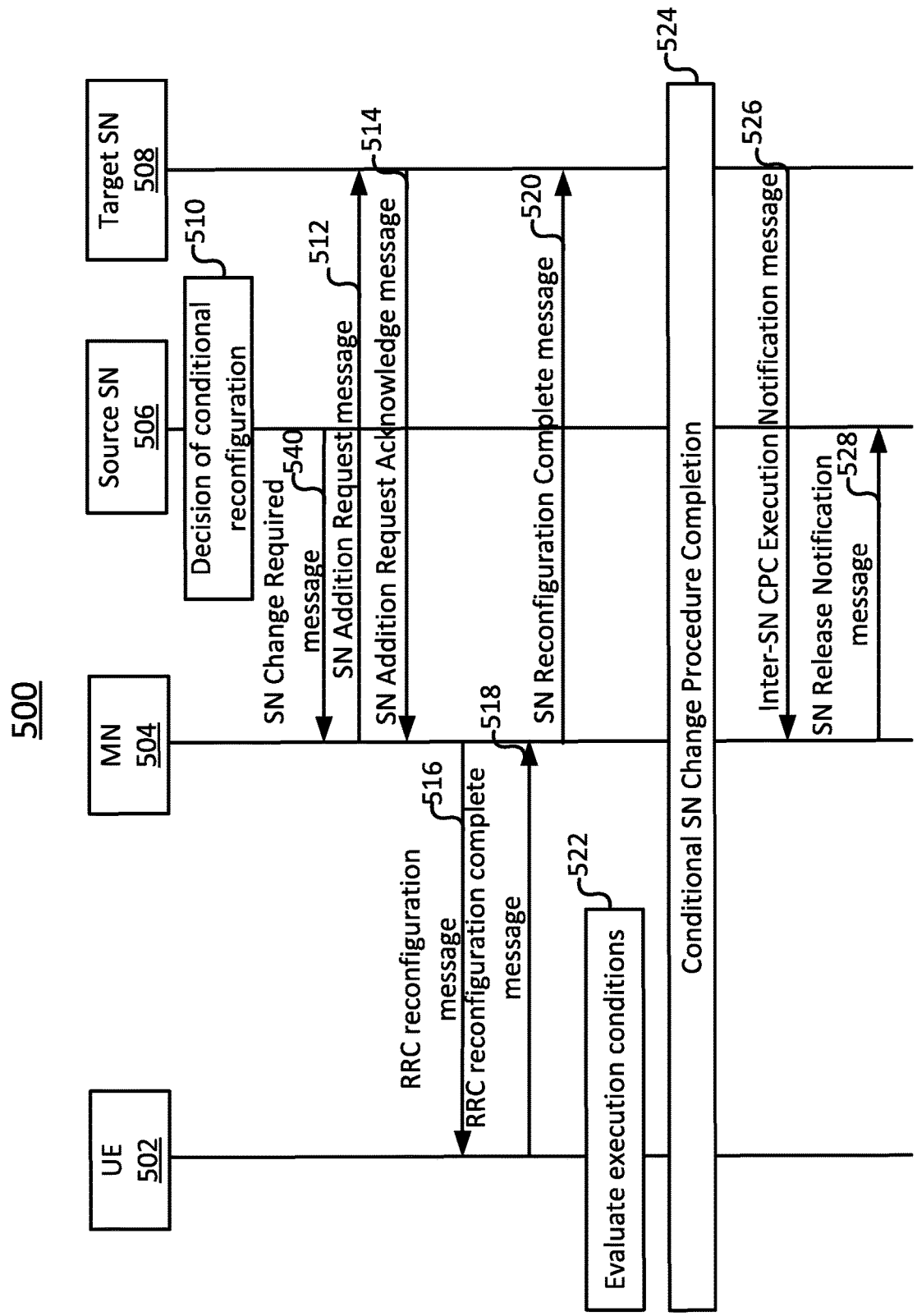
FIG. 5 illustrates an SN-initiated inter-SN CPC procedure according to another example implementation of the present disclosure.

FIG. 5 illustrates an SN-initiated inter-SN CPC procedure 500 according to another example implementation of the present disclosure. In action 510, a source SN 506 may decide to use conditional reconfiguration for inter-SN PSCell change (or SN change). In some implementations, the source SN 506 (or the current serving SN) may configure a UE 502 with measurement procedures and the UE 502 may provide measurement reports according to the configured measurement procedures. Based on the measurement reports received from the UE 502, the source SN 506 may decide to use conditional reconfiguration for inter-SN PSCell change (or SN Change). For example, if SRB3 is configured, the source SN 506 may receive the measurement report from the UE 502 via SRB3. For example, if SRB3 is not configured, the source SN 506 may receive the measurement report from the UE 502 via SRB1.

The inter-SN PSCell change procedure may cause the UE 502 to change from a PSCell in the source SN 506 to another PSCell in a target SN 508. In one implementation, the UE 502 may receive a conditional reconfiguration for PSCell change from an MN 504. The conditional reconfiguration for PSCell change may include a configuration of a target PSCell and an execution condition. In one implementation, the configuration of the target PSCell in the conditional reconfiguration for PSCell change may be generated by the target SN 508. In one implementation, the execution condition in the conditional reconfiguration for PSCell change may be generated by the source SN 506.

Actions 512, 514, 516, 518, 520, and 522 may be corresponding to actions 212, 214, 216, 218, 220, and 222 in FIG. 2, respectively. In action 540, the source SN 506 may initiate the SN change procedure by sending an SN Change Required message, which may include a candidate target node ID, the SCG configuration (to support delta configuration), and measurement results related to the target SN 508. In some implementations, the SN Change Required message may include related information to indicate that the SN change request is a conditional SN change request.

In action 524, the UE 502 may synchronize to the target cell and may complete the conditional SN change procedure by sending an RRC Reconfiguration Complete message to the target SN 508. In some implementations, the RRC Reconfiguration Complete message may include specific information (e.g., the UE ID, target cell ID, information related to the target SN 508, the executed conditional reconfiguration command (ID), or indication/information of condition SN change, but not limited thereto) to indicate to the target SN 508 which related conditional reconfiguration command is executed.

In action 526, the target SN 508 may send a notification message (e.g., an inter-SN CPC Execution Notification message) to the MN 504 after receiving the RRC Reconfiguration Complete message from the UE 502. In some implementations, the notification message may include specific information (e.g., the UE ID, target cell ID, information related to the target SN 508, the executed conditional reconfiguration command (ID), or indication/information of condition SN change, but not limited thereto).

In action 528, the MN 504 may send an SN Release Notification message to the source SN 506 after receiving the notification message (e.g., inter-SN CPC Execution Notification message) from the target SN 508. The SN Release Notification message may include a cause indicating SCG Mobility. In some implementations, the SN Release Notification message may include a cause indicating conditional SCG Mobility. In some implementations, the source SN 506 may not reject the release. For example, the source SN 506 may reject the release if the cause indicates normal SCG Mobility. The source SN 506 may not reject the release if the cause indicates conditional SCG Mobility.

In some implementations, if data forwarding is required, the MN 504 may provide data forwarding addresses to the source SN 506 (e.g., within the SN Release Notification message or other messages). Note that the SN Release Notification message may be the same as an SN Release Request message. In some implementation, the source SN 506 may reject the SN Release Request message, but the source SN 506 may only accept the SN Release Notification message.

SN Addition Procedure

Figure 6:
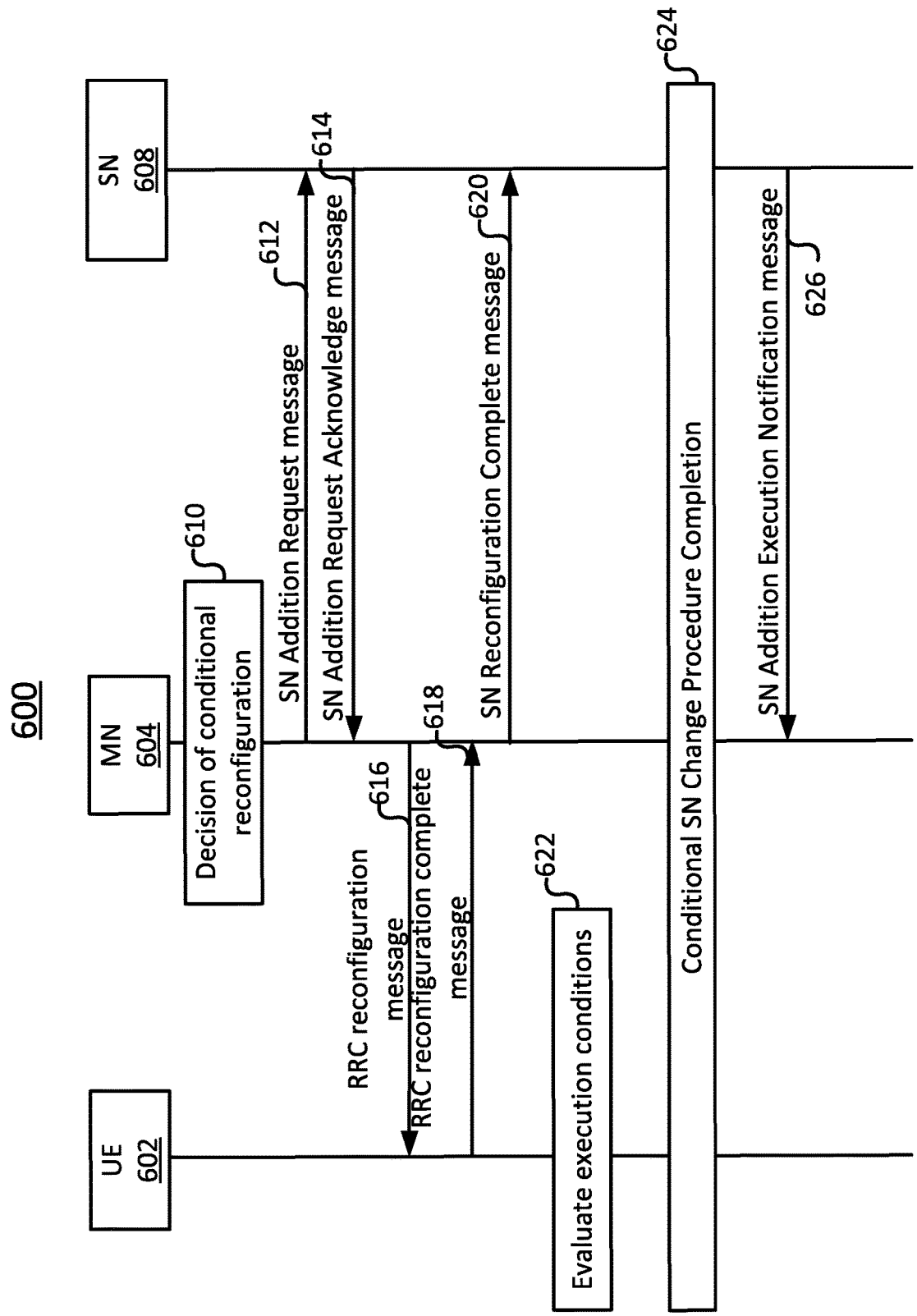
FIG. 6 illustrates an SN addition procedure according to an example implementation of the present disclosure.

FIG. 6 illustrates an SN addition procedure 600 according to an example implementation of the present disclosure. In some implementations, conditional reconfiguration for PSCell Addition/Change may be adopted for an SN Addition procedure.

In action 610, an MN 604 may decide to use conditional reconfiguration for SN addition. In some implementations, the MN 604 may configure a UE 602 with measurement procedures and the UE 602 may provide measurement reports according to the configured measurement procedures. Based on the measurement reports received from the UE 602, the MN 604 may decide to use conditional reconfiguration for normal HO or conditional reconfiguration for SN addition.

In action 612, the MN 604 may decide to request an SN 608 to allocate resources for one or more specific PDU Sessions or Quality of Service (QoS) Flows, indicating QoS Flows characteristics (e.g., QoS Flow Level QoS parameters, PDU session level Transport Network Layer (TNL) address information, and PDU session level Network Slice info). The MN 604 may send an SN Addition Request message to the SN 608. In some implementations, for bearers requiring SCG radio resources, the MN 604 may indicate to the SN 608 the requested SCG configuration information, including the entire UE capabilities and the UE capability coordination result. In some implementations, the MN 604 may provide the latest measurement results for the SN 608 to choose and configure the SCG cell(s). In some implementations, the SN Addition Request message may include related information to indicate that the SN addition request is a conditional SN addition request.

In action 614, the SN 608 may send an SN Addition Request Acknowledge message back to the MN 604 (e.g., when the SN 608 determines that the request passes the Admission control of the SN 608). In some implementations, the SN Addition Request Acknowledge message may include configuration(s) of candidate cells and/or associated execution condition(s) for the conditional reconfiguration.

In action 616, the MN 604 may send to the UE 602 an RRC Reconfiguration message that includes one or more conditional reconfiguration command(s). Each conditional reconfiguration command may include configuration(s) of candidate cell(s) and execution condition(s). In action 618, the UE 602 may send an RRC Reconfiguration Complete message to the MN 604.

In action 620, if the RRC connection reconfiguration procedure is successful, the MN 604 may inform the SN 608 via an SN Reconfiguration Complete message with the SN RRC response message for the SN 608 included, if received from the UE 602. In some other implementations, if the RRC connection reconfiguration procedure is successful, the MN 604 may not inform the SN 608 via the SN Reconfiguration Complete message with the SN RRC response message for the SN 608 included, if received from the UE 602.

In action 622, the UE 602 may maintain connection with the MN 604 after receiving the conditional reconfiguration and start evaluating the execution conditions for the candidate cell(s). If one candidate cell satisfies the corresponding execution condition and this cell is for the purpose of SN addition, the UE 602 may not detach from the MN 604. The UE 602 may apply the stored corresponding configuration for the selected candidate cell and may synchronize to that candidate cell.

In action 624, the UE 602 may synchronize to the target cell and may complete the conditional SN addition procedure by sending an RRC Reconfiguration Complete message to the SN 608. In some implementations, the RRC Reconfiguration Complete message may include specific information (e.g., the UE ID, target cell ID, information related to the SN 608, the executed conditional reconfiguration command (ID), or indication/information of condition SN addition, but not limited thereto) to indicate to the SN 608 which related conditional reconfiguration command is executed.

In action 626, after receiving the RRC Reconfiguration Complete message from the UE 602, the SN 608 may send an SN Addition Execution Notification message to the MN 604. In some implementations, the SN Addition Execution Notification message may include specific information (e.g., the UE ID, target cell ID, information related to the SN 608, the executed conditional reconfiguration command, or indication/information of condition SN addition, but not limited thereto).

In some implementations, data forwarding and/or a path switch procedure may be performed to complete the SN addition procedure. In some implementations, in case of SN terminated bearers using RLC AM, the MN 604 may send SN Status Transfer to the SN 608. In some implementations, in case of SN terminated bearers using RLC AM, and dependent on the bearer characteristics of the respective QoS Flows, the MN 604 may take actions to minimize service interruption due to activation of MR-DC (data forwarding). In some implementations, for SN terminated bearers, the update of the user plane path towards the 5GC is performed via the PDU Session Path Update procedure.

SN-Initiated Intra-SN CPC (with MN Involved)

In some implementations, the SN may use an SN-initiated SN Modification Procedure (with MN involved) to trigger conditional reconfiguration for PSCell change, which may also be referred to as an intra-SN CPC procedure. In some implementations, the SN may use an SN-initiated SN Modification Procedure (via SRB1) to trigger an intra-SN CPC procedure if SRB3 is not configured.

Figure 7:
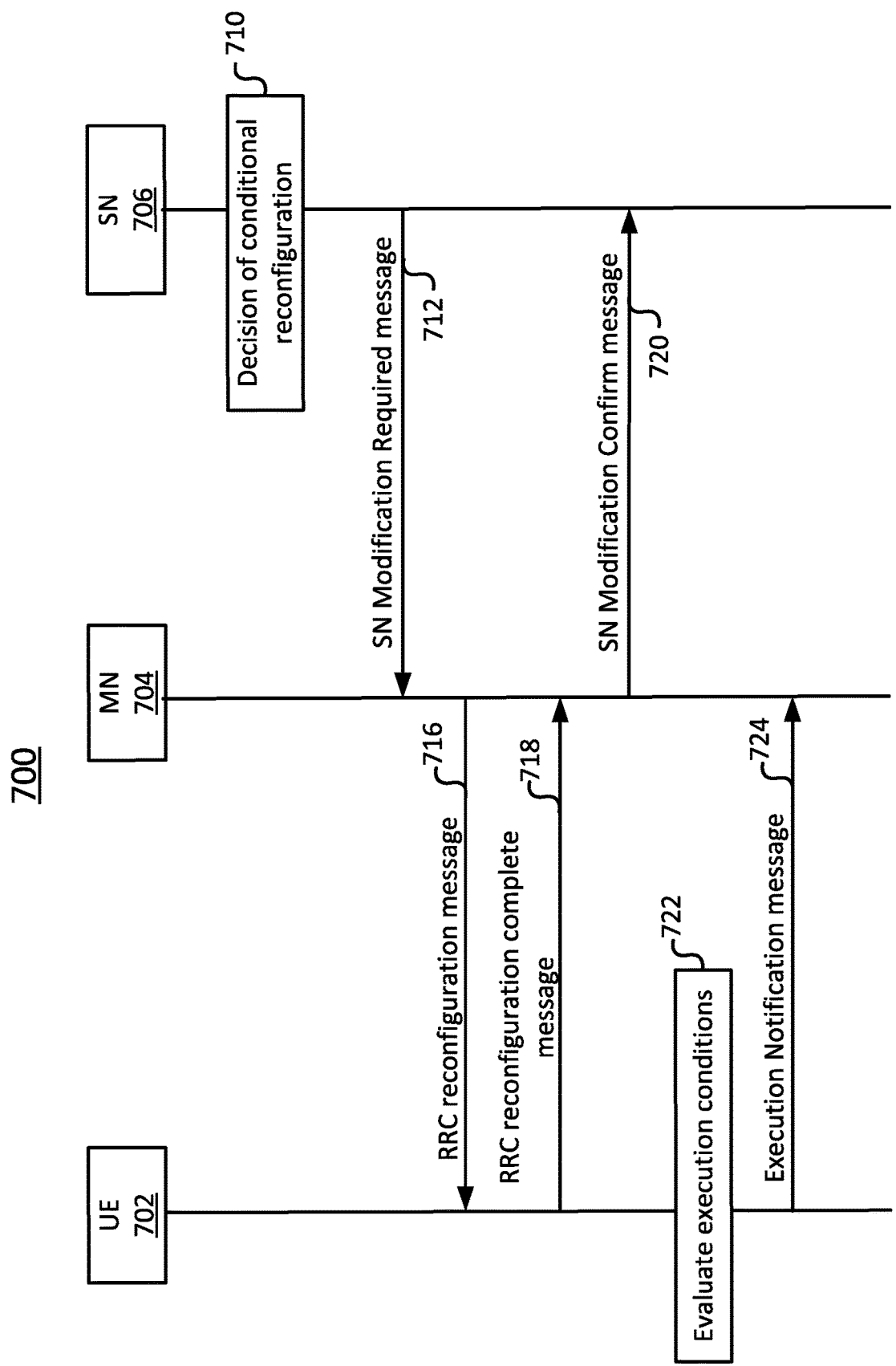
FIG. 7 illustrates an SN-initiated intra-SN CPC procedure according to an example implementation of the present disclosure.

FIG. 7 illustrates an SN-initiated intra-SN CPC procedure 700 according to an example implementation of the present disclosure. In action 710, an SN 706 may decide to use conditional reconfiguration for intra-SN PSCell change. The intra-SN PSCell change procedure may change the PSCell in the SN 706 from a cell in the SN 706 (also referred to as the source PSCell) to another cell in the SN 706 (also referred to as the target PSCell). In one implementation, a UE 702 may receive a conditional reconfiguration for PSCell change from an MN 704. The conditional reconfiguration for PSCell change may include a configuration of a target PSCell and an execution condition. In one implementation, the configuration of the target PSCell in the conditional reconfiguration for PSCell change may be generated by the SN 706. The execution condition in the conditional reconfiguration for PSCell change may also be generated by the SN 706.

In action 712, the SN 706 may send to the MN 704 an SN Modification Required message including an SN RRC reconfiguration message, which may contain user plane resource configuration related context, other UE context related information, and the new radio resource configuration of SCG. In some implementations, the MN 704 may initiate the SN Modification procedure that is triggered by the SN Modification Required message (e.g., when an SN security key change needs to be applied). In some implementations, the SN Modification Required message may include a conditional reconfiguration command for PSCell change (also referred to as intra-SN PSCell change). In some implementations, the conditional reconfiguration command for intra-SN PSCell change may contain configuration(s) of candidate cell(s) (e.g., candidate PSCell(s)) and execution condition(s) generated by the same SN 706.

In action 716, the MN 704 may send to the UE 702 an MN RRC reconfiguration message that includes the SN RRC reconfiguration message with the new SCG radio resource configuration and/or the conditional reconfiguration command(s). The MN RRC Reconfiguration message may include one or more conditional reconfiguration command(s) for PSCell change. Each conditional reconfiguration command may include configuration(s) of the candidate cell(s) and execution condition(s). The MN RRC reconfiguration message in action 716 may be transmitted via SRB1 to the UE 702.

In action 718, the UE 702 may send an RRC Reconfiguration Complete message to the MN 704. In action 720, the MN 704 may send a confirm message (e.g., an SN Modification Confirm message) to the SN 706 after receiving the RRC Reconfiguration Complete message from the UE 702.

In action 722, the UE 702 may evaluate the execution conditions for the candidate cell(s) (e.g., candidate PSCell(s)). The UE 702 may apply the configuration of a target cell (e.g., a target PSCell) and synchronize to the target cell (e.g., the target PSCell) after determining that the execution condition corresponding to the target cell (e.g., the target PSCell) is satisfied. In some implementations, if a conditional reconfiguration command is included in the MN RRC reconfiguration message, the UE 702 may start evaluating the execution condition(s) upon receiving the configuration (e.g., action 716) and may stop evaluating the execution condition(s) during the execution of the conditional reconfiguration once the execution condition(s) is met. If at least one candidate cell satisfies the corresponding execution condition, the UE 702 may apply the stored corresponding configuration for the selected candidate cell and synchronize to the candidate cell. The UE 702 may not detach from the SN 706 when executing the conditional reconfiguration for intra-SN PSCell change. In some implementations, if a conditional reconfiguration command for intra-SN PSCell change is executed, the UE 702 may send a bye/response message to the SN 706. For example, the UE 702 may send the bye/response message to inform the MN 704 that the conditional reconfiguration command is executed after the intra-SN CPC procedure is completed.

In one implementation, the UE 702 may not detach from the MN 704 when applying/executing the conditional reconfiguration for PSCell change. The UE 702 may maintain connection with the PCell in the MN 704. In action 724, the UE 702 may send a response message (e.g., an Execution Notification message) to the MN 704 after determining that the conditional reconfiguration for PSCell change is applied/executed. The response message in action 724 may be transmitted via SRB1 to the MN 704.

In some implementations, a conditional reconfiguration command may be associated with an indication (or related information) to indicate that the conditional reconfiguration command is for intra-SN PSCell change. In some implementations, if a conditional reconfiguration command with an indication (or related information) to indicate that the conditional reconfiguration command is for intra-SN PSCell change is executed, the UE 702 may not detach from the SN 706.

SN-Initiated Intra-SN PSCell Change (without MN Involved)

In some implementations, the SN may use an SN-initiated SN Modification Procedure (without MN involved) to trigger conditional reconfiguration for PSCell change, which may also be referred to as an intra-SN CPC procedure. In some implementations, the SN may use an SN-initiated SN Modification Procedure (without MN involved) to trigger an intra-SN CPC procedure if SRB3 is configured.

In some implementations, the SN may send an SN RRC reconfiguration message to the UE via SRB3. In some implementations, the SN RRC Reconfiguration message may include a conditional reconfiguration command for PSCell change (e.g., an intra-SN PSCell change). In some implementations, the conditional reconfiguration command for intra-SN PSCell change may include configuration(s) of candidate cell(s) and execution condition(s) generated by the same SN.

In some implementations, if a conditional reconfiguration command is included in the SN RRC reconfiguration message, the UE may start evaluating the execution condition upon receiving the conditional reconfiguration command, and the UE may stop evaluating the execution condition during the execution of the conditional reconfiguration command once the execution condition(s) is met. If at least one candidate cell satisfies the corresponding execution condition, the UE may apply the stored corresponding configuration for the selected candidate cell and synchronize to the selected candidate cell. The UE may not detach from the SN when executing the conditional reconfiguration command for intra-SN PSCell change. In some implementations, if a conditional reconfiguration command is executed, the UE may send a bye/response message to the SN.

In some implementations, a conditional reconfiguration command may be associated with an indication (or related information) to indicate that the conditional reconfiguration command is for intra-SN PSCell change. In some implementations, if a conditional reconfiguration command with an indication (or related information) to indicate that the conditional reconfiguration command is for intra-SN PSCell change is executed, the UE may not detach from the SN.

Signaling Combination

In some implementations, a UE may send an RRC Reconfiguration Complete message (or other RRC signaling), which may be used to inform the compliance/execution/completion of a conditional reconfiguration command (or the associated CPC/CPA procedure) to the MN when the conditional reconfiguration command is executed/applied. In some implementations, the MN may determine that a conditional reconfiguration command is executed (or the associated CPC/CPA procedure is completed) when receiving an RRC Reconfiguration Complete message (or other RRC signaling), which may be used to inform the compliance/execution/completion of the conditional reconfiguration command (or the associated CPC/CPA procedure). For example, the UE may complete the CPC/CPA procedure by sending to the MN an RRC signaling (e.g., ULInformationTransferMRDC message) that includes an embedded RRC Reconfiguration Complete message to the new target PSCell. The MN may then forward the SN RRC response message (e.g., the embedded RRC Reconfiguration Complete message), if received from the UE, to the SN by including it in the SN Modification Confirm message.

In some implementations, an RRC Reconfiguration Complete message (or other RRC signaling) may include specific information (e.g., the UE ID, target cell ID, information related to the target SN, the executed conditional reconfiguration command (ID), or indication/information of condition SN change, but not limited thereto). The MN may determine that a conditional reconfiguration command is executed based on the information included in the RRC Reconfiguration Complete message (or in the other RRC signaling).

In some implementations, when the MN receives an RRC Reconfiguration Complete message (or other RRC signaling) that indicates that a conditional reconfiguration command is executed, the MN may send an SN Change Confirm message, an SN Release Request message, or an SN Release Notification message to the source SN. In some implementations, when the MN receives an RRC Reconfiguration Complete message (or other RRC signaling) that indicates that a conditional reconfiguration command is executed, the MN may inform the target SN via an SN Reconfiguration Complete message with the included SN RRC response message for the target SN. The SN Reconfiguration Complete message or the SN RRC response message may include the information of the UE ID, the target cell ID, the executed conditional reconfiguration command (ID), or indication/information of condition SN change, but not limited thereto.

Figure 8:
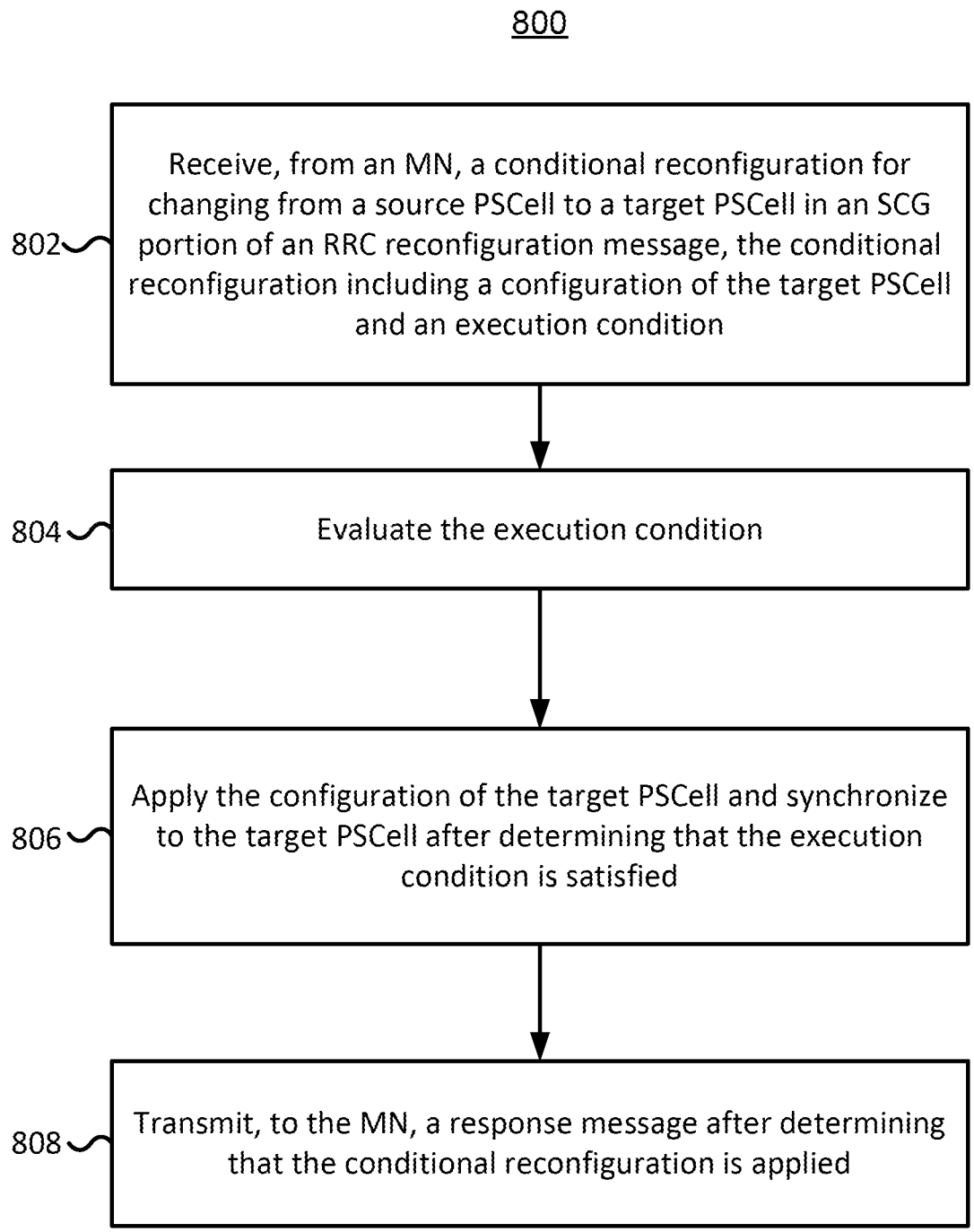
FIG. 8 illustrates a method for a CPC procedure performed by a UE according to an example implementation of the present disclosure.

FIG. 8 illustrates a method 800 for a CPC procedure performed by a UE according to an example implementation of the present disclosure. In action 802, the UE may receive, from an MN, a conditional reconfiguration for changing from a source PSCell to a target PSCell in an SCG part of an RRC reconfiguration message. The conditional reconfiguration may include a configuration of the target PSCell and an execution condition. In one implementation, the conditional reconfiguration may include multiple configurations of multiple target PSCells and multiple execution conditions, each of which may be associated with one of the configurations of the target PSCells. In one implementation, the RRC reconfiguration message may include an MCG part and an SCG part. The MCG part may include configuration information related to the MCG and the SCG part may include configuration information related to the SCG. In one implementation, the conditional reconfiguration for changing from the source PSCell to the target PSCell may be in the SCG part of the RRC reconfiguration message. In one implementation, the RRC reconfiguration message may be transmitted from the MN to the UE via SRB1.

In one implementation, the source PSCell and the target PSCell may belong to the same SN. The CPC procedure performed by the UE may be an intra-SN CPC procedure. In one implementation, the configuration of the target PSCell and the execution condition may be generated by the same SN. The SN may transmit the configuration of the target PSCell and the execution condition to the MN, and then the MN may transmit the configuration of the target PSCell and the execution condition to the UE.

In one implementation, the source PSCell may belong to a source SN and the target PSCell may belong to a target SN different from the source SN. The CPC procedure performed by the UE may be an inter-SN CPC procedure. In one implementation, the configuration of the target PSCell may be generated by the target SN and the execution condition may be generated by the source SN. The source SN may transmit the execution condition to the MN and the target SN may transmit the configuration of the target PSCell to the MN. The MN may then transmit the configuration of the target PSCell and the execution condition to the UE. Alternatively, the source SN may transmit to the MN the configuration of the target PSCell generated by the target SN together with the associated execution condition(s) generated by the source SN.

In action 804, the UE may evaluate the execution condition(s). In action 806, the UE may apply the configuration of the target PSCell and synchronize to the target PSCell after determining that the execution condition is satisfied. In one implementation, the UE does not detach from the MN when executing the conditional reconfiguration for changing from the source PSCell to the target PSCell.

The UE may store multiple conditional reconfigurations, which may be received via different RRC messages. For example, the multiple conditional reconfigurations stored in the UE may include one or more conditional reconfigurations for handover, one or more conditional reconfigurations for PSCell change, and one or more conditional reconfigurations for PSCell addition. The one or more conditional reconfigurations for PSCell change may include the conditional reconfiguration received in action 802 and other conditional reconfigurations for PSCell change. In one implementation, the UE may stop evaluating all execution conditions in the other (or all) conditional reconfigurations for PSCell change stored in the UE after determining that the conditional reconfiguration for changing from the source PSCell to the target PSCell is applied/executed. In one implementation, the UE may release all conditional reconfigurations for PSCell change stored in the UE after the conditional reconfiguration for changing from the source PSCell to the target PSCell is applied/executed successfully. In one implementation, the UE may not release conditional reconfigurations for handover or PSCell addition after the conditional reconfiguration for changing from the source PSCell to the target PSCell is applied/executed successfully.

In action 808, the UE may transmit, to the MN, a response message after determining that the conditional reconfiguration is applied/executed. The response message may indicate to the MN the application/execution of the conditional reconfiguration. In one implementation, the response message may be transmitted from the UE to the MN via SRB1.

In one implementation, the UE may transmit, to the MN, a UE capability report indicating that the UE supports the conditional reconfiguration for changing from the source PSCell to the target PSCell. In one implementation, the UE capability report may be transmitted before action 802.

In one implementation, the RRC reconfiguration message received in action 802 may include an indicator that indicates whether the conditional reconfiguration is for the CPC procedure or a CHO procedure.

Figure 9:
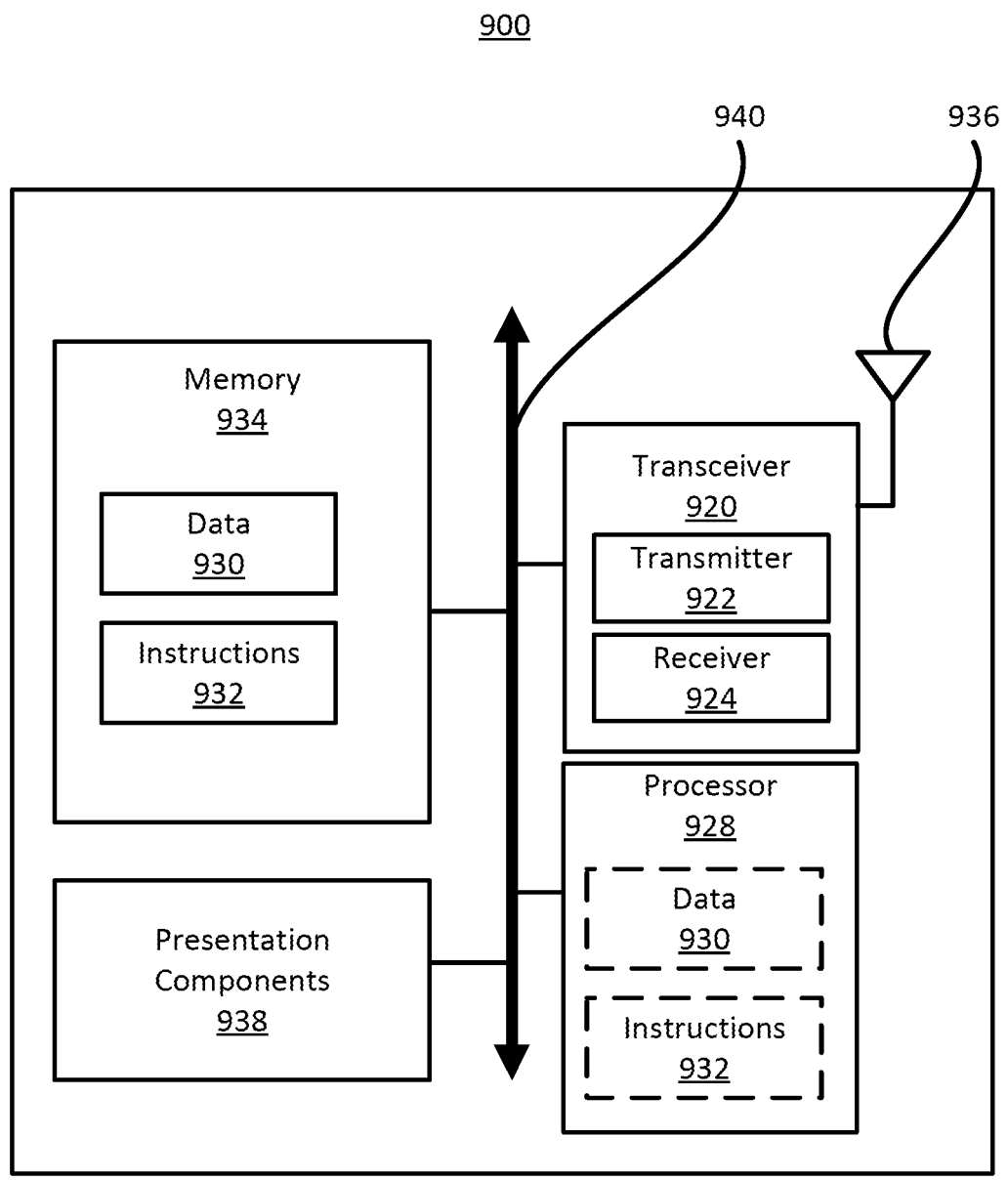
FIG. 9 illustrates a block diagram of a node for wireless communication according to an example implementation of the present disclosure.

FIG. 9 illustrates a block diagram of a node 900 for wireless communication according to an example implementation of the present disclosure. As illustrated in FIG. 9, a node 900 may include a transceiver 920, a processor 928, a memory 934, one or more presentation components 938, and at least one antenna 936. The node 900 may also include a radio frequency (RF) spectrum band module, a BS communications module, a network communications module, and a system communications management module, Input/Output (I/O) ports, I/O components, and a power supply (not illustrated in FIG. 9).

Each of the components may directly or indirectly communicate with each other over one or more buses 940. The node 900 may be a UE or a BS that performs various functions disclosed with reference to FIGS. 1 through 8.

The transceiver 920 has a transmitter 922 (e.g., transmitting/transmission circuitry) and a receiver 924 (e.g., receiving/reception circuitry) and may be configured to transmit and/or receive time and/or frequency resource partitioning information. The transceiver 920 may be configured to transmit in different types of subframes and slots including, but not limited to, usable, non-usable, and flexibly usable subframes and slot formats. The transceiver 920 may be configured to receive data and control channels.

The node 900 may include a variety of computer-readable media. Computer-readable media may be any available media that may be accessed by the node 900 and include both volatile and non-volatile media, and removable and non-removable media.

The computer-readable media may include computer storage media and communication media. Computer storage media may include both volatile and non-volatile media, and removable and non-removable media implemented in any method or technology for storage of information such as computer-readable instructions, data structures, program modules, or data.

Computer storage media may include RAM, ROM, EPROM, EEPROM, flash memory or other memory technology, CD-ROM, Digital Versatile Disks (DVD) or other optical disk storage, magnetic cassettes, magnetic tape, and magnetic disk storage or other magnetic storage devices. Computer storage media may not include a propagated data signal. Communication media may typically embody computer-readable instructions, data structures, program modules, or other data in a modulated data signal, such as a carrier wave, or other transport mechanism and include any information delivery media.

The term "modulated data signal" means a signal that has one or more of its characteristics set or changed in such a manner as to encode information in the signal. Communication media may include wired media, such as a wired network or direct-wired connection, and wireless media, such as acoustic, RF, infrared, and other wireless media. Combinations of any of the previously listed components should also be included within the scope of computer-readable media.

The memory 934 may include computer-storage media in the form of volatile and/or non-volatile memory. The memory 934 may be removable, non-removable, or a combination thereof. Example memory may include solid-state memory, hard drives, optical-disc drives, etc. As illustrated in FIG. 9, the memory 934 may store computer-readable, computer-executable instructions 932 (e.g., software codes) that are configured to cause the processor 928 to perform various functions disclosed herein, for example, with reference to FIGS. 1 through 8. Alternatively, the instructions 932 may not be directly executable by the processor 928 but be configured to cause the node 900 (e.g., when compiled and executed) to perform various functions disclosed herein.

The processor 928 (e.g., having processing circuitry) may include an intelligent hardware device, e.g., a Central Processing Unit (CPU), a microcontroller, an ASIC, etc. The processor 928 may include memory. The processor 928 may process the data 930 and the instructions 932 received from the memory 934, and information transmitted and received via the transceiver 920, the baseband communications module, and/or the network communications module. The processor 928 may also process information to be sent to the transceiver 920 for transmission via the antenna 936 to the network communications module for transmission to a core network.

One or more presentation components 938 may present data indications to a person or another device. Examples of presentation components 938 may include a display device, a speaker, a printing component, and a vibrating component, etc.

It is obvious that various techniques may be used for implementing the concepts in the present disclosure without departing from the scope of those concepts. Moreover, while the concepts have been disclosed with specific reference to specific implementations, a person of ordinary skill in the art may recognize that changes may be made in form and detail without departing from the scope of those concepts. As such, the disclosed implementations are to be considered in all respects as illustrative and not restrictive. It should also be understood that the present disclosure is not limited to the particular implementations disclosed, and many rearrangements, modifications, and substitutions are possible without departing from the scope of the present disclosure.

What is claimed is:

1. A master node for performing a Conditional Primary Secondary Cell Group (SCG) Cell (PSCell) Change (CPC) procedure, the master node comprising:
   one or more non-transitory computer-readable media storing computer-executable instructions; and
   at least one processor coupled to the one or more non-transitory computer-readable media, the at least one processor configured to execute the computer-executable instructions to cause the master node to:
   receive, from a user equipment (UE), a UE capability report indicating that the UE supports conditional reconfiguration for a PSCell change;
   transmit, to the UE, in an SCG portion of a radio resource control (RRC) reconfiguration message, a first conditional reconfiguration for transitioning from a source PSCell to a target PSCell, the first conditional reconfiguration including a configuration of the target PSCell and an execution condition; and
   receive, from the UE, a response message after the first conditional reconfiguration is applied by the UE, wherein
   the first conditional reconfiguration enables the UE to:
   evaluate the execution condition, and
   apply the configuration of the target PSCell and synchronize to the target PSCell after the execution condition is evaluated as satisfied.

2. The master node of claim 1, wherein both the source PSCell and the target PSCell belong to a secondary node.

3. The master node of claim 2, wherein the configuration of the target PSCell and the execution condition are generated by the secondary node.

4. The master node of claim 1, wherein the source PSCell belongs to a source secondary node, the target PSCell belongs to a target secondary node, the configuration of the target PSCell is generated by the target secondary node, and the execution condition is generated by the source secondary node.

5. The master node of claim 1, wherein the first conditional reconfiguration further enables the UE to:
   release all conditional reconfigurations for PSCell change stored in the UE after the first conditional reconfiguration is applied successfully.

6. The master node of claim 1, wherein the first conditional reconfiguration further enables the UE to:
   cease evaluating all execution conditions in other conditional reconfigurations for PSCell change stored in the UE after the first conditional reconfiguration is applied.

7. The master node of claim 1, wherein the first conditional reconfiguration further enables the UE to:
   forgo detaching from the master node when applying the first conditional reconfiguration.

8. The master node of claim 1, wherein the RRC reconfiguration message includes an indicator that indicates whether the first conditional reconfiguration is for the CPC procedure.

9. The master node of claim 1, wherein the RRC reconfiguration message is transmitted, and the response message is received, via a signaling radio bearer 1 (SRB1).

10. A method for a Conditional Primary Secondary Cell Group (SCG) Cell (PSCell) Change (CPC) procedure performed by a master node, the method comprising:
    receiving, from a user equipment (UE), a UE capability report indicating that the UE supports conditional reconfiguration for a PSCell change;
    transmitting, to the UE, in an SCG portion of a radio resource control (RRC) reconfiguration message, a first conditional reconfiguration for transitioning from a source PSCell to a target PSCell, the first conditional reconfiguration including a configuration of the target PSCell and an execution condition; and
    receiving, from the UE, a response message after the first conditional reconfiguration is applied by the UE, wherein
    the first conditional reconfiguration enables the UE to:
    evaluate the execution condition, and
    apply the configuration of the target PSCell and synchronize to the target PSCell after the execution condition is evaluated as satisfied.

11. The method of claim 10, wherein both the source PSCell and the target PSCell belong to a secondary node.

12. The method of claim 11, wherein the configuration of the target PSCell and the execution condition are generated by the secondary node.

13. The method of claim 10, wherein the source PSCell belongs to a source secondary node, the target PSCell belongs to a target secondary node, the configuration of the target PSCell is generated by the target secondary node, and the execution condition is generated by the source secondary node.

14. The method of claim 10, wherein the first conditional reconfiguration further enables the UE to:
 release all conditional reconfigurations for PSCell change stored in the UE after the first conditional reconfiguration is applied successfully.

15. The method of claim 10, wherein the first conditional reconfiguration further enables the UE to:
 cease evaluating all execution conditions in other conditional reconfigurations for PSCell change stored in the UE after the first conditional reconfiguration is applied.

16. The method of claim 10, wherein the first conditional reconfiguration further enables the UE to:
 forgo detaching from the master node when applying the first conditional reconfiguration.

17. The method of claim 10, wherein the RRC reconfiguration message includes an indicator that indicates whether the first conditional reconfiguration is for the CPC procedure.

18. The method of claim 10, wherein the RRC reconfiguration message is transmitted, and the response message is received, via a signaling radio bearer 1 (SRB1).

* * * * *